US012703198B2

(12) United States Patent
Kratzer

(10) Patent No.: US 12,703,198 B2
(45) Date of Patent: Aug. 11, 2026

(54) TRANSFER FOIL, METHOD FOR PRODUCING A TRANSFER FOIL AND METHOD FOR PRODUCING A PLASTIC ARTICLE DECORATED USING A TRANSFER FOIL

(71) Applicant: LEONHARD KURZ Stiftung & Co. KG, Fürth (DE)

(72) Inventor: Andreas Kratzer, Fürth (DE)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 106 days.

(21) Appl. No.: 18/281,015

(22) PCT Filed: Mar. 1, 2022

(86) PCT No.: PCT/EP2022/055140
§ 371 (c)(1),
(2) Date: Sep. 8, 2023

(87) PCT Pub. No.: WO2022/189211
PCT Pub. Date: Sep. 15, 2022

(65) Prior Publication Data

US 2024/0294031 A1 Sep. 5, 2024

(30) Foreign Application Priority Data

Mar. 12, 2021 (DE) ..................... 10 2021 106 085.0

(51) Int. Cl.
*B44C 1/17* (2006.01)

(52) U.S. Cl.
CPC ............ *B44C 1/1716* (2013.01); *B44C 1/172* (2013.01)

(58) Field of Classification Search
CPC ..... B44C 1/1716; B44C 1/172; B44C 1/1712; B44F 1/02
See application file for complete search history.

(56) References Cited

U.S. PATENT DOCUMENTS 3,666,516 A 5/1972 Dunning
4,517,235 A 5/1985 Ungar et al.
(Continued)

FOREIGN PATENT DOCUMENTS

DE 100 54 503 A1 6/2002
DE 0 992 020 B1 3/2003
(Continued)

OTHER PUBLICATIONS

DIN EN 20105-A02 ("Textilien—Farbechtheitsprüfungen—Teil A02: Graumaßstab zur Bewertung der Änderung der Farbe (ISO 105-A02:1993); Deutsche Fassung EN 20105-A02:1994", Ausgabedatum: Oct. 1994).

(Continued)

*Primary Examiner* — George R Koch
*Assistant Examiner* — Christopher C Caillouet
(74) *Attorney, Agent, or Firm* — Hoffmann & Baron, LLP

(57) ABSTRACT

A The invention relates to a transfer film (10), which has a carrier film (12) having a master structure varnish (18) and a transfer ply (14), arranged on the carrier film (12) and detachable from the carrier film (12), including a topcoat (16), wherein the master structure varnish (18) is arranged on the carrier film (12) on its side facing the transfer ply (14) and has a master structure and wherein a master structure is molded on the carrier film (12) on its side facing the transfer ply (14) and wherein the topcoat (16) includes a structuring which has a structure complementary to the master structure.

34 Claims, 11 Drawing Sheets

(56) References Cited

U.S. PATENT DOCUMENTS

| | | | | |
|---|---|---|---|---|
| 6,369,947 | B1 | 4/2002 | Staub et al. | |
| 2001/0036534 | A1* | 11/2001 | Mullen | B44F 1/02 428/179 |
| 2002/0015828 | A1* | 2/2002 | Ast | B41M 3/12 428/195.1 |
| 2002/0027362 | A1 | 3/2002 | Trantoul | |
| 2004/0021945 | A1 | 2/2004 | Tompkin et al. | |
| 2004/0239099 | A1 | 12/2004 | Tompkin et al. | |
| 2010/0151207 | A1 | 6/2010 | Hansen et al. | |
| 2011/0143096 | A1 | 6/2011 | Huang | |
| 2015/0192897 | A1 | 7/2015 | Schilling et al. | |
| 2016/0129718 | A1 | 5/2016 | O'Leary et al. | |
| 2017/0239898 | A1 | 8/2017 | Tompkin et al. | |
| 2018/0164475 | A1 | 6/2018 | Meyer et al. | |
| 2019/0381821 | A1 | 12/2019 | Schmidt et al. | |
| 2022/0111676 | A1 | 4/2022 | Fraschina et al. | |
| 2023/0286312 | A1 | 9/2023 | Mader et al. | |

FOREIGN PATENT DOCUMENTS

| | | | |
|---|---|---|---|
| DE | 101 50 293 | A1 | 4/2003 |
| DE | 10 2005 017 170 | A1 | 10/2006 |
| DE | 10 2012 105 571 | A1 | 1/2014 |
| DE | 10 2015 114 097 | A1 | 3/2017 |
| DE | 10 2017 101 595 | B3 | 5/2018 |
| DE | 10 2018 123 482 | A1 | 3/2020 |
| EP | 2 686 172 | B1 | 6/2015 |
| EP | 2 237 968 | B1 | 2/2020 |
| JP | 6-210816 | A | 8/1994 |
| WO | 2009/083147 | A2 | 7/2009 |
| WO | 2019/048499 | A1 | 3/2019 |
| WO | 2019/224692 | A1 | 11/2019 |

OTHER PUBLICATIONS

DIN EN 20105-A03.

DIN EN ISO 2409:Jun. 2013 ("Beschichtungsstoffe—Gitterschnittprüfung (ISO 2409:2013), Deutsche Fassung der EN ISO 2409:2013", Ausgabedatum: Jun. 2013).

ASTM D3359-09 ("Standard Test Methods for Measuring Adhesion by Tape Test", Ausgabedatum: 2009).

DIN EN ISO 105-X12 ("Textilien—Farbechtheitsprüfungen—Teil X12: Farbechtheit gegen Reiben (ISO 105-X12:2016); Deutsche Fassung EN ISO 105X12:2016", Ausgabedatum: Nov. 2016).

ISO 105-A03:Oct. 2019 ("Textilien—Farbechtheitsprüfungen—Teil A03: Graumastaßstab zur Bewertung des Anblutens", Ausgabedatum: Oct. 2019).

International Search Report.

German Examination Report.

Liu Xiusheng, Modern Painting Technology, Mechanical Industry Press, Jan. 2016, p. 276.

Chinese Office Action dated Nov. 15, 2025.

* cited by examiner

| **Description** | **Surface** | **ISO characteristic value** | **ASTM characteristic value** |
|---|---|---|---|
| The edges of the cuts are completely smooth, no section of the coating has flaked. | - | GT 0 | 5B |
| Small flakes of the coating have detached at the intersections of the cut lines; flaked area approximately 5% of the sections. | 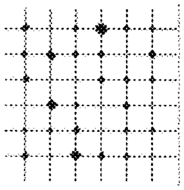 | GT 1 | 4B |
| The coating has flaked along the edges of the cuts and/or at the intersections of the cut lines; flaked area approximately 15% of the sections. | 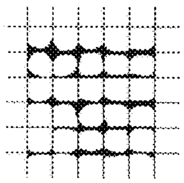 | GT 2 | 3B |
| The coating has flaked partially or completely in broad strips along the edges of the cuts and/or the coating has flaked completely or partially on individual sections; flaked area approximately 35% of the sections. | 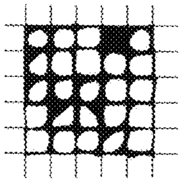 | GT 3 | 2B |
| The coating has flaked in broad strips along the edges of the cuts and/or completely or partially on individual sections; flaked area approximately 65% of the sections. | 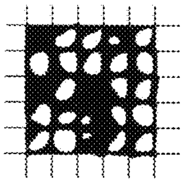 | GT 4 | 1B |
| Flaked area more than 65% of the sections. | - | GT 5 | 0B |

Fig. 11

TRANSFER FOIL, METHOD FOR PRODUCING A TRANSFER FOIL AND METHOD FOR PRODUCING A PLASTIC ARTICLE DECORATED USING A TRANSFER FOIL

This application is a National Stage application based on an International Application filed under the Patent Cooperation Treaty PCT/EP2022/055140, filed Mar. 1, 2022, which claims priority to DE 102021106085.0, filed Mar. 12, 2021.

BACKGROUND OF THE INVENTION P The invention relates to a transfer film, a method for producing a transfer film and a method, in particular an insert-molding method, an IMD (in-mold decoration) method, a hot-stamping method, a laminating method and/or an IML (in-mold labeling) method, for producing a plastic article decorated with a transfer film.

Plastic films are used for the surface decoration of plastic parts. Plastic parts decorated in such a way are used for example in automobile manufacturing for automobile interior parts such as door trims, instrument panel trims and center console covers, in the field of consumer electronics for decorative trims on televisions or in the electronics and telecommunications field for housing shells for portable devices such as mobile telephones or laptops. The surface decoration of plastic parts for example by means of insert-molding technology is a combined method of hot stamping, vacuum forming and injection molding, wherein first a transfer film is applied to a plastic substrate by means of hot stamping, this plastic substrate is deformed, in particular is deep-drawn, three-dimensionally or 2.5-dimensionally once the carrier film has been peeled off the transfer film, and then the plastic substrate is back-injection molded with a plastic injection-molding material. In the case of the surface decoration of plastic parts, for example when IMD technology or IML technology is used a plastic film is inserted into an injection mold and then back-injection molded with a plastic injection-molding material.

However, it is not known that fine or high-resolution surface structures, for example geometric, organic or technical surface structures, can be introduced in a targeted manner in the case of the surface decoration of plastic articles. On the one hand, extruded surface structures do not have the necessary level of detail. On the other hand, known plastic films which have the desired surface structures are limited in their scope of application and are not suitable for methods in which the film is deformed, deep-drawn and/or back-injection molded. Such a method with the corresponding thermal and/or mechanical loads would lead to a loss of the desired level of detail of the surface structures in the case of the above-named plastic films.

SUMMARY OF THE INVENTION

The object of the present invention is thus to provide an improved transfer film which can be used in a broad scope of application, in particular also in the field of an insert-molding method, an IMD method, a hot-stamping method, a laminating method and/or an IML method, without impairing the properties of the transfer film during the processing with respect to the visual appearance and/or the surface feel.

The object is achieved with a transfer film, according to the present invention, which has a carrier film comprising a master structure varnish and a transfer ply, arranged on the carrier film and detachable from the carrier film, comprising a topcoat, wherein the master structure varnish is arranged on the carrier film on its side facing the transfer ply and has a master structure and wherein the topcoat comprises a structuring which has a structure complementary to the master structure.

The object is further achieved with a method for producing a transfer film, in particular for use in an insert-molding method, an IMD method, a hot-stamping method, a laminating method and/or an IML method, wherein which has a carrier film comprising a master structure varnish and a transfer ply, arranged on the carrier film and detachable from the carrier film, comprising a topcoat, and wherein a master structure, in particular master relief structure, is introduced into or generated in the master structure varnish and the topcoat is applied to the master structure, wherein a structure complementary to the master structure of the carrier film is molded into the topcoat.

The transfer film according to the invention, or the transfer film produced according to a method according to the invention, can be used in an insert-molding method, an IMD method, a hot-stamping method, a laminating method and/or an IML method. In other words, the transfer film according to the invention, or the transfer film produced according to a method according to the invention, can be used as a transfer film for insert molding, as an IMD film, as a hot-stamping film, as a laminating film and/or as an IML film.

The object is further achieved with a method, in particular with an insert-molding method, an IMD method, a hot-stamping method, a laminating method and/or an IML method, for producing a plastic article or film article decorated with a transfer ply of a transfer film, with one or more of the following steps, which are preferably carried out in the following order:

- providing a transfer film, in particular a transfer film according to the present invention, in particular comprising a carrier film comprising a master structure varnish and a transfer ply, arranged on the carrier film and detachable from the carrier film, comprising a topcoat, wherein the master structure varnish is arranged on the carrier film on its side facing the transfer ply and has a master structure and wherein the topcoat comprises a structuring which has a structure complementary to the master structure,
- peeling the carrier film, together with the master structure, off the transfer ply of the transfer film,
- optionally arranging the transfer film in an injection mold,
- optionally back-injection molding the transfer film with a plastic injection-molding material,
- obtaining a decorated plastic article or a film article.

It is further possible to provide a film article which comprises a transfer film according to the invention, wherein the transfer ply of the transfer film is arranged on a substrate.

Further, it is also conceivable to provide a plastic article which comprises a transfer film according to the invention.

The invention makes it possible to obtain a transfer film or a transfer ply of a transfer film with a surface structure, wherein the decoration of the film can be freely chosen, i.e. the structure can be introduced in a targeted manner locally and with non-random properties, and for example is not limited to structures of particles, thus random structures and/or arrangements. Areas with preferably different optical properties or optical effects, such as for example reflection, color, absorption, refractive index and/or gloss, are possible. The individual properties can be correspondingly adapted to the respective intended use. For example geometric, organic, holographic and/or technical structures are thus possible.

In addition, the introduced structures can, in addition to the above-named properties, also have functional properties, such as for example fingerprint resistance, dirt-resistant and/or liquid-repellent functions, for example lotus effect. Optical properties and functional properties can be implemented as alternatives or also in combination with each other.

In addition, the film can be used well in application methods with thermal energy input and/or mechanical stress, in particular in an insert-molding method, an IMD method, a hot-stamping method, a laminating method and/or an IML method. Here, the preferably introduced structures are only slightly influenced, for example deformed, by the thermal and/or mechanical stress, for example during a deformation and/or back-injection molding process. They can thereby also bring about the intended optical and/or haptic effect after the process.

The advantageous optical and/or haptic effect is achieved in the present case in particular by the chosen structuring of the surface of the topcoat by means of a master structure. The tactilely or haptically feelable properties of the surface, the fingerprint resistance, dirt-resistant and/or liquid- and/or oil-repellent functions and/or the optical properties of the surface can be controlled through a targeted selection of the structuring.

The invention furthermore makes it possible for the topcoat to have a structuring without having to contain particles. This is achieved in particular in that the master structure is molded into the topcoat. This means in particular that the master structure forms a negative mold and leaves corresponding indentations in the topcoat. Overall, particular optical and/or functional, in particular haptic, properties can thereby be provided with the film according to the invention. In particular, no further protective varnish layer needs to be applied to the topcoat, as a particularly resistant topcoat is formulated by the materials used. In particular, the topcoat is particularly resistant to chemical and/or mechanical loads. In other words, the topcoat displays only minimal optical and/or haptic alterations, such as for example gloss, color, structure, and/or a detachment of the topcoat from the transfer ply, etc., even after a longer exposure to chemical and/or mechanical loads.

Further advantageous designs of the invention are described in the dependent claims.

The carrier film preferably has a carrier layer, wherein the carrier layer is arranged on the side of the carrier film facing away from the transfer ply.

The carrier layer is preferably formed from ABS, ABS/PC, PET, PC, PMMA, PE and/or PP. The layer thickness of the carrier layer is advantageously selected from a range of from 5 μm to 100 μm, in particular from 20 μm to 80 μm.

The master structure varnish has the replicated master structure. Here, it is preferred that the replicated master structure varnish has a raised and/or recessed structure or surface. The master structure preferably has a relief structure, preferably master relief structure.

The replicated master structure varnish is preferably arranged on the plane spanned by the carrier layer over the whole surface or partially. The master structure varnish is preferably applied single-layered.

If the master structure varnish is applied only partially, then a further varnish, in particular a varnish with a surface that is not raised and/or recessed, preferably with a smooth and/or unstructured surface, is preferably arranged at least in areas in the areas on the carrier layer in which no master structure varnish is arranged.

The master structure varnish preferably has components curable by UV radiation and/or a thermoplastic varnish.

The UV-curable master structure varnish can be constructed for example from components selected individually or in combination from: monomeric or oligomeric polyester acrylates, polyether acrylates, urethane acrylates, epoxy acrylates, amine-urethane acrylates.

By a thermoplastic varnish is meant a varnish system, which preferably comprises polymers, preferably thermoplastic, dissolved in solvents, which form a polymer film through the removal of the solvent, preferably without the molar mass of the polymers altering, preferably increasing, because of chemical reactions.

For example, a thermoplastic varnish which is suitable as master structure varnish can be a varnish with the following composition:

| Constituent: | Proportion by weight: |
|---|---|
| Methyl ethyl ketone | 200 to 600, preferably 300 to 500 |
| Ethyl acetate | 100 to 400, preferably 200 to 300 |
| Butyl acetate | 50 to 300, preferably 100 to 200 |
| Polymethyl methacrylate (softening point approx. 170° C.) | 50 to 250, preferably 100 to 200 |
| Cellulose nitrate | 50 to 250, preferably 100 to 200 |

The replicated master structure varnish preferably has a layer thickness in the range of from 0.1 μm to 100 μm, in particular from 0.5 μm to 50 μm, preferably from 1.0 μm to 30 μm.

It is advantageous if the master structure varnish has a structure depth from a range of from 0.2 μm to 30 μm, preferably from 3 μm to 20 μm.

Through such a structure depth, a particularly good haptic and/or a particularly good optically variable effect, thus an optical impression dependent on the viewing angle, of the master structure varnish can be achieved.

The master structure varnish preferably has a stretchability of at least 50%, preferably of at least 100%. In particular in the case of a necessary deformation of the master structure varnish in a production method and/or application method, the sufficient stretchability of the master structure varnish is advantageous.

This makes a shapeable master structure varnish possible. As a result of such a stretching behavior of the master structure varnish, the latter has a particularly good shapeability, with the result that the carrier film comprising the master structure varnish, and thus the transfer film, is particularly well suited to use in IMD methods, hot-stamping methods and/or IML methods.

Alternatively, for example in the case of an insert-molding method, the carrier film with the master structure varnish can be removed before the deformation of the transfer film. If this is the case, a stretchability of the master structure varnish plays only a subordinate role for this use.

During the shaping of a transfer film comprising a carrier film, for example in the IMD method, the carrier film of the transfer film absorbs most of the tensile forces. The stretching properties of the master structure varnish ensure in particular that the master structure varnish incurs no damage, in particular in the form of cracks or microcracks, during the back-injection molding of the transfer film. The values of the stretchability were ascertained in a tensile test with the Zwick Z005 test apparatus from Zwick GmbH & Co. KG, Ulm.

In this tensile test, standardized test specimens are measured with respect to their sample cross section. They were then clamped in a tensile testing machine (Zwick Z005 test apparatus from Zwick GmbH & Co. KG, Ulm) and stretched at constant feed rate until tearing. The tensile testing machine records the relationship between stress and strain of the sample in a stress-strain curve via the measurement of the required force taking into account the measured sample cross section and the measurement of the distance. In this process, the progression of the required force and the strain is plotted. Important individual characteristic values are the tear strength and the elongation at break.

The tear strength is the value, ascertained by a tensile test, of the tensile stress applied at the moment when a test specimen being tested breaks and/or tears. The strain is given in percent and corresponds to the length of the sample body in relation to the starting length. The elongation at break is the value, ascertained by a tensile test, of the strain of a test specimen being tested at the moment when the test specimen tears. In other words, the stretchability of the test specimen corresponds to the strain before permanent damage occurs to the test specimen.

The topcoat is preferably arranged in the transfer film such that it forms the topmost layer of the transfer ply on the side of the transfer ply facing the carrier film. In other words, the topcoat preferably forms the outermost layer on the decorated plastic item. Preferably, no further protective varnish layer is attached to the topcoat.

The topcoat preferably has a layer thickness in the range of from 0.1 μm to 60 μm, preferably from 0.5 μm to 40 μm, preferably from 1.0 μm to 30 μm.

Preferably, the topcoat is formed transparent and/or has, in particular in the wavelength range of from 380 nm to 780 nm, a transmittance of at least 25%, preferably of at least 35%, further preferably of at least 85%.

Furthermore, it is possible for the topcoat to be dyed, in particular for the topcoat to be dyed by means of dyes and/or pigments, and/or for the pigmentation level of the topcoat to be less than 15%, preferably less than 10%, further preferably less than 5%. It is also possible for the topcoat to be colorless and/or for the pigmentation level of the topcoat to be 0%. Thus, it is possible for the topcoat to be and/or to form an in particular unpigmented clear varnish layer.

The topcoat can have a gloss value in a range of from 1 to 98, preferably in a range of from 10 to 90.

Gloss values are thus advantageously settable in a very wide range. In particular, very matte surfaces are thus also possible because of correspondingly designed structures, which are not possible through other varnishes, in particular known structured protective varnishes.

The gloss values are measured at a measuring angle of 60° with the "micro-gloss" meter from Byk-Gardener GmbH, Geretsried. During the gloss measurement, a precisely defined directed light beam is directed, in particular at a 60° angle, for example onto a varnish surface and/or the transfer film and/or the topcoat and a reflectometer lying opposite measures how much light is reflected at a 60° angle (grazing angle). The gloss is advantageously calibrated to 100 GU (gloss units) (=100%) by a standard. The highest achievable gloss value are thus preferably 100 GU. The gloss value is advantageously given in percent (%). It is therefore expedient if the unit of the gloss value is percent (%) in this case. The measured gloss value is therefore preferably a value from a range of from 0% to 100%. Thus, the gloss units are in particular percentage values and the gloss units represent in particular percentage values.

Advantageously, no or only an insignificant formation of glossy spots occurs during use of the transfer film, for example during shaping, in particular during deep-drawing. In other words, the gloss value of the shaped transfer film lies in a range of from 90% to 110%, preferably from 95% to 105%, of the gloss value of the unshaped transfer film, in particular in areas of surface with comparatively large strains of the topcoat and/or the transfer ply of the transfer film, in particular in the case of strains of the topcoat in a range of from approx. 50% to approx. 200%, in particular from 50% to 200%.

Preferably, the topcoat has a stretchability of at least 50%, preferably of at least 150%, in particular preferably of at least 200%.

This makes a shapeable topcoat possible. As a result of such a stretching behavior of the topcoat, the transfer film having the topcoat is particularly well suited for example to use in the insert-molding method, in the IMD method, in the hot-stamping method and/or in the IML method.

The stretching properties of the topcoat ensure in particular that no formation of cracks and/or microcracks occurs during the stretching of the transfer ply. The values of the stretching were ascertained in a tensile test with the Zwick Z005 test apparatus from Zwick GmbH & Co. KG, Ulm. With respect to carrying out the tensile test, reference may be made to the statements relating to the master structure varnish.

It is advantageous if the topcoat has a temperature resistance of up to 250° C., preferably of up to 200° C.

It can hereby be ensured that the topcoat withstands the thermal loads, for example through hot injection-molding material, in particular in the insert-molding method, in the IMD method and/or in the IML method, or through a hot stamping tool in the hot-stamping method, and in particular only slightly, ideally no alteration of the structuring and/or the surface of the topcoat occurs.

Advantageously, the topcoat is formed from long-chain polymers. The polymers can be formed crosslinked. The crosslinking and/or curing is preferably based on an application of thermal energy and/or UV radiation.

The topcoat is preferably formed from polymers selected individually or in combination from: polymethyl acrylates, polymethyl methacrylates, polyvinylidene flouride, copolymers of polymethyl acrylates and polyvinylidene fluoride, copolymers of polymethyl methacrylate and polyvinylidene flouride.

Polyvinylidene fluoride (PVDF) is in particular a fluoroplastic, preferably produced from hydrogen fluoride and methyl chloroform, wherein polyvinylidene fluoride has particularly good thermal resistance and mechanical strength with at the same time high elasticity. Advantageously, polyvinylidene fluoride is moreover chemically inert and has a vapor- and moisture-repellent action, and therefore has a particularly high chemical resistance.

In addition, the topcoat can be formed from aqueous polymer dispersions, preferably from aqueous polyurethane dispersions, based on components selected individually or in combination or as hybrid dispersions from: polyether, polyester, polycarbonate, natural castor oil polyols, natural linseed oil polyols, acrylate dispersions, styrene/acrylate dispersions, vinyl acetate dispersions.

The aqueous polymer dispersions can be formulated as a one-component (1C) binder system, wherein a thermal drying is carried out in order to generate a dry layer, but no chemical crosslinking of the molecular groups takes place in the process.

The aqueous polymer dispersions can be formulated as a one-component (1C) binder system, wherein a chemical crosslinking of the molecular groups takes place because reactive molecular groups of the polymers crosslink with each other, initiated by means of UV radiation.

Alternatively, the aqueous polymer dispersions can be formulated as a two-component (2C) system, wherein in addition to the polymer or polymers as one component there is a second component for crosslinking the reactive groups of the polymers, wherein the second component is in particular selected individually or in combination from polyisocyanates, isocyanates, carbodiimides, aziridines. In the case of a two-component system, a further chemical crosslinking of the polymers can additionally take place by means of UV radiation.

In addition, the topcoat can be formed from polymers selected individually or in combination from: polyol, polyurethane (PU), copolymers of polyurethane (PU) and polyol, copolymers of polyurethane (PU) and polyacrylate. The polyurethanes (PU) are preferably formulated into a topcoat via a cobinder, for example via polyols and/or via melamine resins, or with an isocyanate binder.

The topcoat and/or individual components of the topcoat can be both thermally dried and/or curable by means of chemical crosslinking, in particular by means of polyisocyanate crosslinking and/or by means of aziridine crosslinking and/or by means of carbodiimide crosslinking and/or by UV curing or UV crosslinking.

Polyisocyanates preferably comprise components which comprise at least two isocyanate groups, in particular wherein the isocyanate groups are at least one group selected from diisocyanate monomer, diisocyanate oligomer, diisocyanate-terminated prepolymer, diisocyanate-terminated polymer, polyisocyanate monomer, polyisocyanate oligomer, polyisocyanate-terminated prepolymer, and/or polyisocyanate-terminated polymer, and/or mixtures thereof.

It is further possible here for the diisocyanate-comprising component to comprise at least one component selected individually or in combination from: polyurethane oligomer, polyurea oligomer, polyurethane prepolymer, polyurea prepolymer, polyurethane polymer, polyurea polymer.

The term “polyisocyanate” is preferably used in order to denote essentially components with more than two isocyanate groups, including triisocyanates and higher-functionalized isocyanates.

The components which comprise at least two isocyanate groups further preferably comprise at least one group selected individually or in combination from: hexamethylene diisocyanate (HDI), isophorone diisocyanate (IPDI), methylene diphenyl diisocyanate (MDI), toluene diisocyanate (TDI), phenylene diisocyanate, naphthalene diisocyanate (NDI), diphenyl sulfone diisocyanate, ethylene diisocyanate, propylene diisocyanate, dimers of these diisocyanates, trimers of these diisocyanates, triphenylmethane triisocyanate, polyphenylmethane polyisocyanate (polymerized MDI).

The components having hydroxyl groups used in particular for a polyisocyanate crosslinking, in particular hydroxyl-functional acrylic components, are preferably selected individually or in combination from: hydroxy monoacrylate, hydroxy diacrylate, hydroxy polyacrylate, hydroxyl-functional aliphatic polyether urethane monoacrylate, hydroxyl-functional aliphatic polyester urethane monoacrylate, hydroxyl-functional aromatic polyether urethane monoacrylate, hydroxyl-functional aromatic polyester urethane monoacrylate, hydroxyl-functional polyester monoacrylate, hydroxyl-functional polyether monoacrylate, hydroxyl-functional epoxy monoacrylate, hydroxyl-functional acrylated acrylic monoacrylate, hydroxyl-functional aliphatic polyether urethane diacrylate, hydroxyl-functional aliphatic polyester urethane diacrylate, hydroxyl-functional aromatic polyether urethane diacrylate, hydroxyl-functional aromatic polyester urethane diacrylate, hydroxyl-functional polyester diacrylate, hydroxyl-functional polyether diacrylate, hydroxyl-functional epoxy diacrylate, acrylated acrylic diacrylate, hydroxyl-functional aliphatic polyether urethane polyacrylate, hydroxyl-functional aliphatic polyester urethane polyacrylates, hydroxyl-functional polyether polyacrylate, hydroxyl-functional epoxy polyacrylate, hydroxyl-functional acrylated acrylic polyacrylate.

Melamine resins preferably comprise resins which are obtained by reacting melamine with aldehydes, in particular formaldehyde, acetaldehyde, isobutyraldehyde and glyoxal.

It is further possible for such resins to be partially or completely modified, for example by etherification of the methylol groups obtained with mono- or polyhydric alcohols. In other words, as melamine resins, in particular those which can be obtained by reacting melamine with aldehydes and optionally can be partially or completely modified are suitable.

In particular, formaldehyde, acetaldehyde, isobutyraldehyde and glyoxal are suitable as aldehydes.

Melamine formaldehyde resins are preferably reaction products of the reaction of melamine with aldehydes, e.g. the above-named aldehydes, in particular formaldehyde. Where appropriate, the methylol groups obtained are preferably modified by etherification with mono- or polyhydric alcohols.

Further, it is also advantageous that the topcoat of UV-curable monomers and/or oligomers is selected individually or in combination from the group polyurethanes, polyacrylates, polyurethane acrylates, polymethacrylates, polyester resins, polycarbonates, phenolic resins, epoxy resins, polyureas, and/or melamine resins, in particular further preferably is selected from the group polymethyl methacrylate (PMMA), polyester, polycarbonate (PC), polyvinylidene fluoride (PVDF).

The topcoat is particularly resistant to chemical and/or mechanical loads due to the above-named polymers, in particular due to the polyvinylidene fluoride. This provides the advantage in particular that in the case of the transfer ply a further protective varnish layer can be dispensed with, in particular which would additionally have been applied to the topcoat, with the result that the topcoat preferably forms the exposed visible face of the decorated plastic article. In other words, the topcoat preferably has a high chemical resistance of its surface, preferably a substantially chemically inert surface.

Thus, the topcoat is preferably formed particularly resistant to solvents, such as for example isopropanol and methyl ethyl ketone (MEK), to aggressive substances, such as for example sunscreen, hand cream, fuel, insect repellent (diethyltoluamide (DEET), e.g. Autan®), engine oil, brake fluid, coolant, polish, bitumen and tar remover, bird droppings, tree resin and/or cellulose thinner, to weathering, such as for example sunlight, rain and/or dew, to foodstuffs, such as for example coffee, to cleaning agents and/or to mechanical stresses as well as to high thermal loads.

In particular, the topcoat is also constructed such that it has a very high resistance to insect repellent (e.g. according to test standard Ford FLTM BI 113-08). Here, to test the resistance, insect repellent is applied to a test plate comprising the topcoat. The test plate can comprise further varnish layers, wherein the topcoat forms the exposed visible face. The test plate is placed in a drying cabinet at 23° C. and at 74° C. The test plate is stored horizontally. After 24 hours, the test plate is taken out of the drying cabinet and assessed. Here, the surface of the test plate must not have any defects. In addition, there must not be any loss of adhesion or delamination of the individual layers within the layer structure of the test plate.

Further, the topcoat is in particular also constructed such that it has a very high resistance to sunscreen constituents (e.g. according to Ford FLTM BI 113-08). The sunscreen is spread on a gauze bandage and, together with the gauze bandage, applied to a test plate comprising the topcoat. The test plate can comprise further varnish layers, wherein the topcoat forms the visible face and is in contact with the gauze bandage. The test plate is placed in a drying cabinet at 23° C. and at 74° C. The test plate is stored horizontally. After 24 hours, the test plate is taken out of the drying cabinet and assessed. Here, the surface of the test plate must not have any defects. In addition, there must not be any loss of adhesion or delamination of the individual varnish layers of the test plate.

In particular, the topcoat is constructed such that it has a very high resistance to hand cream constituents, for example determined by a method according to the Volkswagen test standard PV 3964 type B. The hand cream is spread on a gauze bandage and, together with the gauze bandage, applied to a test plate. This test plate can comprise further varnish layers, wherein the topcoat forms the visible face and is in contact with the gauze bandage. The test plate is placed in a drying cabinet at 80° C. The test plate is stored horizontally. After 24 hours, the test plate is taken out of the drying cabinet and assessed. Here, the topcoat must not have any alteration of color or surface feel. The fastness grade on the grayscale, determined using the method according to DIN EN 20105-A02 ("*Textilien—Farbechtheitsprüfungen-Teil A02: Graumaßstab zur Bewertung der Änderung der Farbe [Textiles-Tests for color fastness-Part A02: Grayscale for assessing change in color]* (ISO 105-A02:1993); German version EN 20105-A02:1994", issue date: 1994-10), must be able to be assessed with a value of ≥4.

In order to achieve the above-described resistances, it is advantageous if the topcoat in the solid body has as main components for example polyvinylidene fluoride (PVDF) and polymethyl methacrylate (PMMA) with a proportion by weight in the solid body of at least 50% PVDF and at least 10% PMMA. The topcoat in the solid body preferably has a proportion by weight of at least 60% PVDF and at least 20% PMMA. The topcoat in the solid body particularly preferably has a proportion by weight of approx. 70% PVDF and approx. 30% PMMA, preferably 70% PVDF and 30% PMMA.

Further, the transfer film has a good adhesive strength between the layers. This is determined using a cross-cut test according to test method B according to DIN EN ISO 2409:2013-06 ("Beschichtungsstoffe-Gitterschnittprüfung [Paints and varnishes-Cross-cut test] (ISO 2409:2013), German version of EN ISO 2409:2013", issue date: 2013-06) and/or according to ASTM D3359-09 ("*Standard Test Methods for Measuring Adhesion by Tape Test*", issue date: 2009). The transfer film, if the topcoat forms the exposed visible face, has at least a cross-cut characteristic value (GT) of 1 or 0 according to a visual assessment according to the test method according to DIN EN ISO 2409:2013-06 and/or a value of 4B or 5B according to ASTM D3359-09.

The criteria for a classification of the cross-cut values according to DIN EN ISO 2409:2013-06 or according to ASTM D3359-09 are summarized in FIG. 11.

The good adhesive strength of the layers of the transfer film is achieved in particular by a good chemical coordination of the interactions between the layers that are in contact. This can be promoted for example by promoter layers, preferably adhesion-promoter layers.

A method for testing the abrasion resistance and/or rubbing fastness of plastic parts and printed films is described below. This method corresponds to the test standard PV 3906 from Volkswagen AG. The alteration due to friction resulting from the rubbing, recognizable on the sample, is evaluated visually (Crockmeter or an equivalent device according to DIN EN ISO 105-X12 ("*Textilien—Farbechtheitsprüfungen-Teil X12: Farbechtheit gegen Reiben [Textiles-Tests for color fastness-Part X12: Color fastness to rubbing]* (ISO 105-X12:2016); German version EN ISO 105-X12:2016", issue date: 2016-11)). The samples are prepared or produced on the basis of DIN EN ISO 105-X12 as follows. Before the test the samples are stored for at least 48 hours in standard atmosphere according to VW 50554-23/50-2 (standard atmosphere with an air temperature of (23±2° C.), a relative humidity of (50±6)%, an air pressure of from 86 kPa to 106 kPa and the limit deviation 2). As rubbing cloth, also called rubbing fastness cloth or crocking cloth, a rubbing cloth made of cotton batiste is used according to ISO 105-X12 for the evaluation of the rubbing fastness of dyes. A white rubbing cloth is rubbed under controlled conditions against the printed test specimen in a straight movement. The rubbing tests against dry and wet rubbing cloth are to be carried out, if possible, in an air-conditioned room. All samples are to be carefully brushed down and/or vacuumed beforehand. "Wet" describes a rubbing cloth with approx. 100% absorbed moisture, when it has been stored for 1 minute in water and then blotted between filter paper and two glass plates for 1 minute under a load of 10 N. Moist samples and wet rubbing cloth are dried before the evaluation at room temperature according to VW 50554-2 (atmosphere with an air temperature of from 18° C. to 28° C., without taking into account the relative humidity and the air pressure).

The visual evaluation of the abrasion resistance of the surfaces is made according to the following grading system or assessment system:

Grade 1=no visible alteration, e.g. no friction marks;

Grade 2=small alteration, e.g. faintly recognizable friction marks;

Grade 3=clear alteration, e.g. color change, surface damage;

Grade 4=strong alteration, e.g. the base material becoming visible.

To assess the rubbing cloth, a grayscale according to ISO 105-A03:2019-10 ("*Textiles-Tests for color fastness-Part A03: Grayscale for assessing staining*", issue date: 2019-10) is used for assessing staining. On the grayscale for assessing staining there are nine matte, gray and white small plate pairs with different contrast levels. An undyed, untreated rubbing cloth before and after the fastness test are compared with the grayscale. The staining, thus the color change of the rubbing cloth due to dye absorption of the dye released by the sample during the test, is assessed visually. With the aid of the grayscale this is classified into the grades 1 to 5 (with four half-classes). Grade 1 indicates a strong staining, in the case of grade 5 no visible staining takes place.

The following friction tests can be carried out, wherein each friction test is effected on a separate sample. In addition to the abrasion resistance according to the above-named grading system, the fastness grade of the grayscale is also assessed (according to DIN EN 20105-A03). All friction tests are passed corresponding to the requirements.

| Test carried out | Requirement |
|---|---|
| 2000 double strokes dry (component parts in the high-stress area) | Component part: grade ≤ 2 (according to PV 3906, point 5.5, appraisal or visual evaluation)<br>Rubbing cloth: fastness grade of the grayscale ≥ 4 (DIN EN 20105-A03) |
| 10 strokes with white gas (boiling range 80° C. to 100° C.) | Component part: grade 1 (according to PV 3906, point 5.5, appraisal or visual evaluation)<br>Rubbing cloth: fastness grade of the grayscale ≥ 4 (DIN EN 20105-A03) |

The relief structure replicated in the master structure varnish and/or the complementary relief structure of the topcoat is preferably a non-random relief structure.

By a non-random relief structure is preferably meant a relief structure which is formed in a targeted manner and does not occur because of random surface roughnesses of material surfaces. Thus, non-random relief structures are recognizable in particular by the fact that they are reproducible in a targeted manner and can be present identically in several end products. If for example a relief structure with a desired profile shape is for example generated on an industrial scale in an endless carrier film, then a correspondingly structured stamp or cylinder, which has a finite length, is usually used for this. Because of the continuous use of the structured tool on the endless carrier film, the molded relief structures repeat at regular distances on the carrier film and are thus recognizably non-random relief structures, even if at first glance a random relief structure appears to be present locally.

A non-random relief structure is furthermore recognizable for example by the fact that particular profile shapes, which usually do not or only very rarely feature, occur massed, periodically or quasiperiodically. While a rather undefined and rounded profile shape is to be expected of a random relief structure, such as for example of a surface roughness and/or of introduced particles, non-random relief structures display for example exact and geometrically formed profile shapes such as rectangular profiles, sinusoidal profiles, sawtooth profiles, hemispherical profiles or blazed structures. Further, non-random relief structures can also comprise or consist of a design, in particular technical designs, such as for example carbon fibers, waves, polygons, etc., and/or organic designs, such as for example wood grains. Furthermore, non-random relief structures display for example binary profiles or profiles with profile depth staggered in the manner of a staircase, in particular with constant profile depth, such as in particular the binary profiles described in DE 10054503 B4. A special case for a staircase-like profile is for example a rectangular profile wherein the local profile depths can adopt only discrete levels. The distances between two neighboring depressions preferably lie in a range of from 0.25 μm to 100 μm, preferably from 0.5 μm to 50 μm. The profile depth, relative to an average level, is preferably less than 15 μm, preferably less than 10 μm, particularly preferably less than 7 μm and in particular preferably values from DE 102012105571 A1. Microscopically fine, non-random relief structures with locally varying structure depth are disclosed for example in EP 0992020 B1.

The non-random relief structure can also be a microstructure diffracting achromatically in a directed manner, such as is described for example in DE 102018123482 A1. This provides the advantage in particular that the incident radiation can be projected, diffracted and/or scattered in a targeted manner at one or more solid angles.

The content of the patent applications named in the preceding paragraphs is to be regarded as included herewith.

It is advantageous if the master relief structure is designed such that the complementary relief structure comprises a microstructure, in particular a microstructure the dimensions of which lie below the resolution limit of the unaided human eye.

The resolution limit of the unaided human eye preferably lies at structures with dimensions of at least 300 μm.

Further, the master relief structure can be designed such that the complementary relief structure comprises a macrostructure, in particular a macrostructure the dimensions of which lie above the resolution limit of the unaided human eye.

Further, the complementary relief structure can be formed as a microstructure the dimensions of which lie below the resolution limit of the unaided human eye and additionally as a macrostructure which is visible to the unaided human eye. A macrostructure can be present next to a microstructure and/or be superimposed by a microstructure.

A microstructure can advantageously have an optical effect which simulates the presence of a macrostructure.

The complementary relief structure can be formed as a matte structure, as a diffractive structure and/or as a refractive structure and/or as a macrostructure. Further, several of the above-named structures can also be present next to each other and/or be superimposed with each other.

The matte structure is a diffractive structure with stochastic progression, with the result that incident light is dispersed in a random manner. Matte structures have fine relief structure elements on the microscopic scale, which determine the scattering power and can be described with statistical characteristic quantities. By way of example of these characteristic quantities the average distance between the relief structure elements in the x and/or y direction of the plane spanned by the transfer film is the roughness average, Ra, and the correlation length, $I_c$.

Preferred matte structures have an average distance in the range of from 300 nm to 5000 nm, a roughness average, Ra, in the range of from 20 nm to 2000 nm, preferably from 50 nm to 500 nm. The correlation length, $I_c$, preferably lies in the range of from 200 nm to 50000 nm, in particular from 500 nm to 10000 nm.

Diffractive structures are structures which form optical effects based on light diffraction, for example diffraction gratings or holograms. These can be conventional 2D/3D or 3D holograms, which allow the representation of three-dimensional information on the basis of a surface structure. Viewed locally, the profile of a holographically generated hologram, such as for example a Fourier hologram, can be viewed as approximately periodic, wherein typical numbers of lines lie in the range of from 300 lines/mm to 2000 lines/mm and typical structure depths lie in the range of from 50 nm to 800 nm. For achromatic effects, however, very coarse grating structures with numbers of lines in the range of from 10 lines/mm to 300 lines/mm and structure depths in the range of from 0.5 μm to 10 μm can also be used.

A computer-generated hologram, such as for example the so-called kinoform, can create the impression of a stochastic surface relief and have an asymmetric diffraction effect. A typical structure depth is half or a multiple of the wavelength of the incident light and is in accordance with whether the kinoform is to deploy its effect in transmission or reflection.

Further parameters for computer-generated holograms are to be found in WO 2019048499 A1, the content of which is deemed to be included herewith.

Refractive structures are structures which form optical effects based on light refraction and/or light reflection, for example microlenses or micromirrors. Such microlenses or micromirrors are in particular used not individually, but preferably arranged next to each other in a regular or also pseudorandom grid or pixel array. Micromirrors are described for example in EP 2686172 B1, the content of which is included herewith.

Optically variable effects on the basis of the previously named structures can be realized for example by varying one or more structure parameters, for example by varying the grating period, the average distance, the angle of inclination of the micromirrors, the structure depth and/or the azimuthal angle.

Through the above-named properties of the master structure varnish, of the topcoat, as well as the surface structures introduced into these varnishes, defined and reproducible images, motifs and/or structures can be transferred to plastic articles to be decorated. This provides the advantage in particular over so-called soft touch varnishes, which have only a partial or whole-surface undefined, non-reproducible surface roughness. In other words, the master structure in particular comprises particles not added for this purpose, for example mineral particles and/or polymeric particles and/or silicone particles.

The transfer film according to the invention already has a wide variety of designs due to the large selection of surface structures. Furthermore, the transfer film, in particular the transfer ply, can have at least one decorative layer, in particular at least one color layer and/or at least one metalization and/or at least one adhesive layer or primer layer and/or at least one replication layer. The above-named layers can in each case be arranged individually or also in any desired combination with each other in the transfer ply. The layers can be applied here over the whole surface as well as only partially, i.e. in areas. Here, the variety of designs of the transfer film is advantageously increased still further.

The layer thickness of the at least one decorative layer preferably lies in a range of from 0.1 μm to 30 μm, in particular from 0.5 μm to 15 μm.

The at least one decorative layer can have at least one partial or whole-surface color layer for generating a pattern and/or a motif. The at least one color layer can, in particular in the case of partial application, also be in register with the structure of the topcoat, in particular with respect to reflection, absorption and/or refractive index of the topcoat.

By register or registration, or register accuracy or registration accuracy, is meant a positional accuracy of two or more elements and/or layers relative to each other. The register accuracy is to range within a predefined tolerance, which is to be as small as possible. At the same time, the register accuracy of several elements and/or layers relative to each other is an important feature in order to increase the process reliability. The positionally accurate positioning can be effected in particular by means of sensory, preferably optically detectable registration marks or register marks. These registration marks or register marks can either represent specific separate elements or areas or layers or themselves be part of the elements or areas or layers to be positioned.

The at least one decorative layer can further have at least one replication layer, into which diffractively and/or refractively acting micro- or macrostructures are molded. The at least one replication layer is preferably provided with a reflective layer, which can consist of a metalization and/or an HRI layer with a high refractive index (HRI=High Refractive Index). Here, the at least one reflective layer can be opaque, semitransparent or transparent.

One or more of the following structures can be molded in at least one replication layer: a diffractive structure, a zero-order diffraction structure, a blazed grating, a macrostructure, in particular a lens structure or microprism structure, a mirror surface, a matte structure, in particular an anisotropic or isotropic matte structure.

The structures in at least one replication structure can represent a pattern and/or a motif, which are in particular also arranged in register with the color layers of the decorative layer and/or in register with the structure of the master structure varnish.

The at least one decorative layer can further have at least one metalization. The at least one metalization is preferably produced by means of vapor deposition. Cr, In, Sn, Cu and/or Al are particularly suitable as metal. Through the use of a layer made of metal, for example a microembossing film with metallic visual appearance is obtained.

The at least one vapor-deposited metalization can be applied over the whole surface and either preserved over the whole surface or else structured with known demetalization methods such as etching, lift-off or photolithography and thereby be only partially present. However, the at least one metalization can also consist of a printed layer made of metallic pigments in a binder. The printed metallic pigments can be applied over the whole surface or partially and have different colorings in different areas of surface. The at least one metalization can represent a pattern and/or motif, which in particular also be arranged in register with the at least one color layer of at least one decorative layer and/or with the structures of the at least one replication layer.

The at least one decorative layer can further have at least one adhesive layer or primer layer. The at least one adhesive layer or primer layer faces the plastic body, substrate or plastic injection-molding material to be decorated. In other words, it is the bottommost layer of the transfer ply viewed from the carrier film.

The at least one adhesive layer or primer layer ensures in particular that there is good adhesion between the transfer ply of the transfer film and a plastic injection-molding material, a substrate or a plastic body.

The at least one adhesive layer or primer layer preferably has a layer thickness from a range of from 0.1 μm to 10 μm, in particular from 0.1 μm to 3 μm, and can also have several sublayers.

It is possible for a detachment layer to be arranged between the topcoat and the master structure varnish. This detachment layer can support a reliable detachment of the transfer ply from the carrier film, wherein the separating plane is located between topcoat and master structure varnish.

Alternatively or additionally, the master structure varnish and/or the topcoat can have additives, such as for example silicones and/or aliphatic hydrocarbons, in order to prevent too strong an adhesion between the topcoat and the master structure. In other words, the additives reduce the separating force which is necessary in order to detach the master structure varnish from the topcoat.

In order to make a clean detachment of the topcoat from the master structure possible, the separating force or detachment force between topcoat and master structure preferably lies in a range of from 3 N/m to 40 N/m, preferably from 10 N/m to 30 N/m. The separating force is determined using the following procedure.

To determine the separating force, the transfer ply with a width of 35 mm and a length of 150 mm is stamped on an ABS plate at 180° C. and a rate of 13 m/min. The detachment force measurement preferably takes place on a Zwick/Roell Z 1.0 tensile testing machine at room temperature (approx. 20° C.). For this, the transfer ply is peeled off the ABS plate in particular at an angle of 90° and a measured displacement of 150 mm, wherein the detachment force is ascertained.

On the one hand, an easy and reliable detachment of the transfer ply is hereby made possible during use, for example during an insert-molding method, an IMD method, a hot-stamping method, a laminating method, and/or an IML method. On the other hand, it is also achieved that no unintended detachment occurs, for example during production of the film, storage or transport.

The detachment layer preferably has a layer thickness in the range of from 0.001 μm to 2 μm, in particular from 0.05 μm to 1 μm. The function of the detachment layer can thereby be guaranteed without the imaging sharpness of the replicated master structure being substantially negatively influenced by the topcoat, for example by loss of details and/or structure depth.

The detachment layer can have and/or consist of a wax. Such a wax can be for example a carnauba wax, a montanic acid ester, a polyethylene wax, a polyamide wax or a PTFE wax, or mixtures thereof. In particular, surface-active substances, such as for example silicones, or thin layers of melamine-formaldehyde-resin-crosslinked varnishes, are also suitable as detachment layer.

Advantageously, a promoter layer, in particular an adhesion-promoter layer, is arranged on the side of the topcoat facing away from the carrier film. The promoter layer ensures in particular that a very good adhesion is produced between the topcoat and the other layers of the transfer ply.

Further, it can be advantageous if the carrier film has a promoter layer, in particular an adhesion-promoter layer. This is arranged in particular between the master structure varnish and the carrier layer.

As promoter layer of the carrier film and/or of the transfer film, components are preferably applied which are selected individually or in combination from: crosslinkable acrylates, in particular polyacrylates, polyester resins, alkyd resins as well as their modifications, amino resins, amido resins, phenolic resins. The promoter layer of the carrier film and/or of the transfer film thus has and/or consists of the above components. All crosslinkers known in the state of the art can be used for crosslinking the above components. Suitable crosslinkers comprise for example isocyanates, melamines, alcohols and/or aziridines, or mixtures thereof.

A crosslinking can be initiated in particular by UV radiation and/or by application of thermal energy and/or by chemical reaction. A first crosslinking step is preferably effected by means of thermal energy and/or chemical reaction. In an optional further process step, which can also take place with a time delay, a further and additional crosslinking can be effected by means of UV radiation. In particular, a crosslinking is effected by means of thermal energy and/or chemical reaction before the deformation of the transfer film and an optional additional crosslinking is effected by means of UV radiation after the deformation of the transfer film, preferably as one of the last process steps.

Ideally, the promoter layer of the transfer film has a layer thickness in the range of from 0.1 μm to 10 μm, preferably from 0.3 μm to 5 μm, preferably from 0.5 μm to 4 μm.

The promoter layer of the carrier film preferably has a layer thickness in the range of from 0.1 μm to 5 μm, preferably from 0.3 μm to 3 μm, particularly preferably from 0.5 μm to 2 μm.

The layers of the transfer ply arranged on the side of the topcoat facing away from the carrier film, in particular the at least one decorative layer, the promoter layer, the at least one replication layer, the at least one adhesive layer or primer layer, the at least one metalization and/or the at least one color layer, must in each case have at least 80% of the stretchability of the topcoat. In other words, the respective layer has a stretchability of at least 40%, preferably of at least 120%, preferably of at least 160%.

It is advantageous if the master relief structure is generated by applying the master structure varnish to the carrier layer, in particular made of ABS, ABS/PC, PET, PC, PMMA, PE and/or PP. The application of the master structure varnish to the carrier layer is preferably effected in an additional process step. The master structure varnish is preferably applied using a printing method.

It is advantageous to apply, in particular to print, a promoter layer, preferably adhesion-promoter layer, to or on the carrier layer before the application of the master structure varnish. This promoter layer has a layer thickness in the range of from 0.1 μm to 5 μm, preferably from 0.3 μm to 3 μm, particularly preferably from 0.5 μm to 2 μm.

It is advantageous if the master structure varnish is applied with a layer thickness in the range of from 0.1 μm to 100 μm, in particular from 0.5 μm to 50 μm, preferably from 1.0 μm to 30 μm.

A varnish curable by UV radiation can preferably be used as master structure varnish. The UV-curable master structure varnish can be constructed for example from components selected individually or in combination from: monomeric or oligomeric polyester acrylates, polyether acrylates, urethane acrylates, epoxy acrylates, amine-modified polyester acrylates, amine-modified polyether acrylates, amine-modified urethane acrylates.

The UV-curable master structure varnish can be set to be particularly flowable, with the result that it is also able to completely fill the narrowest cavities of the printing roller.

The UV-curable master structure varnish preferably has a dynamic viscosity during spreading in a range of from 10 mPas to 500 mPas, preferably from 50 mPas to 200 mPas, preferably measured with a rotational viscometer at room temperature.

The UV-curable master structure varnish can be cured by inert curing. By inert curing is preferably meant that UV radiation with a wavelength in a range of from 300 nm to 600 nm is conducted through the carrier film, preferably during the spreading of the varnish and/or immediately afterwards. Here, mercury and/or iron-doped mercury lamps are preferably used. A post-curing of the UV-curable master structure varnish is effected by irradiating the master structure varnish with a mercury lamp with a wavelength in a range of from 300 nm to 600 nm.

Alternatively, however, it can also be provided that a thermoplastic varnish which, preferably under the action of pressure and temperature, is replicated is used as master structure varnish. In particular, the pressure lies in a range of from 10 bar to 110 bar, preferably from 15 bar to 60 bar, and/or the temperature lies in a range of from 100° C. to 210° C., preferably from 120° C. to 190° C.

The master structure varnish can be applied to the carrier layer over the whole surface or partially, in particular partially in register with a decoration. Thus, it is also conceivable that the master structure varnish is applied to the carrier layer over the whole surface in a first step and is removed again in areas by means of washing methods or other known structuring processes in a further step. If the master structure varnish is applied to the carrier layer only in areas, it is then advantageous if a further varnish, in particular a varnish with a non-raised surface, preferably with a smooth and/or unstructured surface, is applied at least in areas to the carrier layer in areas where no master structure varnish is arranged.

In order to improve the adhesion between carrier layer and master structure varnish, the carrier layer can be pretreated. This ensures that the master structure varnish, together with the carrier layer, in particular after use in an insert-molding method, an IMD method, a hot-stamping method and/or an IML method, can be completely removed again from the transferred transfer ply. This can be achieved in particular through the pretreatment of the carrier layer. For this purpose, methods such as corona treatment, plasma treatment and/or flame treatment are suitable. Alternatively and/or additionally, a promoter layer can be applied to the carrier layer before the master structure varnish is arranged.

As the above-described examples of the master structure varnish illustrate, in the method according to the invention the properties of the master relief structure can be influenced within broad limits. Here, process steps suitable for mass production can be used.

The topcoat is applied as a varnish, in particular as a thermoplastic varnish or as a UV-curable varnish or as a hybrid varnish with a combination of thermoplastic and UV-curable components.

Preferably, the topcoat is spread by means of a printing roller or a slotted nozzle and is crosslinked and/or cured, in particular by application of thermal energy and/or by UV radiation, after the spreading, preferably still during the production of the transfer film.

The viscosity of the topcoat can be adapted to the structure to be achieved and can be set from a broad spectrum of from very liquid to paste-like. In other words, the viscosity of the topcoat during the application can be a dynamic viscosity from a range of from 15 mPas to 600 mPas, preferably from 25 mPas to 250 mPas, and/or be selected therefrom.

This has the advantage that the topcoat flows for example even into the smallest cavities, which lie below the resolution limit of the unaided human eye, and can reproduce these. This is particularly advantageous compared with extruded, structured materials, as the latter are limited in the selection of their viscosity because of the process conditions.

It is also possible to apply the varnish to the carrier film comprising a replicated master structure varnish by spraying, coating using a doctor blade or pouring.

The replicated master structure varnish acts as a mold for the molding of the relief structure into the topcoat. The molding quality can be improved by pressure and/or temperature during the application of the topcoat.

Alternatively or additionally, a very low-viscosity varnish can also be provided, which is particularly well able to fill even the finest cavities of the master structure varnish. It can generally be provided to cure the applied varnish by application of thermal energy, for example by thermal radiation or by contact with a heated body, for example a rotating roller.

A rotary dryer can be provided in order to form the topcoat with a particularly smooth rear side. When a UV-curable varnish is used, the curing of the topcoat can be carried out particularly easily with a transparent roller or from the front side of the carrier film.

The further layers of the transfer ply, in particular the at least one promoter layer, the at least one decorative layer, preferably the at least one color layer, the at least one replication layer and/or the at least one adhesive layer or primer layer, are advantageously applied to the topcoat by means of printing. Gravure printing, screen printing, flexographic printing or inkjet printing can be used as printing methods. Both metalized and pigmented systems could be used. The application of at least one metalization is effected in particular by means of vapor deposition and/or by means of printing. A promoter layer, preferably an adhesion-promoter layer, can preferably be applied to the carrier film by means of printing.

The method according to the invention is particularly well suited to a continuous process, preferably a roll-to-roll process, in which the layers of the transfer film are spread on the carrier film or carrier film in layers and structured.

Such transfer films are preferably used for decorating plastic articles, for example in an insert-molding method, an IMD method, a hot-stamping method, a laminating method and/or an IML method. Further, such transfer films, even without being back-injection molded, can be used in displays, for example as film articles, for suppressing reflections and/or increasing transmission.

The use of the transfer film as a decorative film has proved to be particularly good. Furthermore, the use of the transfer film according to the invention in an insert-molding method has proved to be particularly good. Further, the transfer film can also be used preeminently in an IMD method, a hot-stamping method, a laminating method and/or an IML method. The use of the transfer film according to the invention for producing a plastic article or film article, decorated with the transfer ply, which has a structured area with particular optical and/or haptic properties in the area of the transfer ply, is also excellent. In other words, the transfer film can be used as an insert-molding film, as an IMD film, as a hot-stamping film, as a laminating film and/or as an IML film.

The transfer film with the structured surface can be applied to a substrate, preferably with a thickness in the range of from 50 μm to 500 μm, preferably from 100 μm to 350 μm, preferably to obtain a film article. In particular, the transfer ply is applied in such a way that, with the side facing away from the topcoat, the transfer ply is in contact with the substrate.

The substrate can be single-layered or multi-layered and be selected for example from PC, ABS/PC, PP, TPU and/or PMMA, or blends and/or coextrudates thereof. The substrate can have a self-supporting layer, in particular wherein further layers have been or are arranged on the self-supporting layer, which are selected individually or in combination from adhesion-promoter layer, detachment layer, metal layer, color layer, functional layer, replication layer, decorative layer and protective layer. The detachment layer is preferably arranged on the side of the self-supporting layer facing the protective layer of the substrate and can remain on the self-supporting layer or remain on the protective layer of the substrate when the self-supporting layer is peeled off. Further, an additional adhesive layer or primer layer can have been or be applied to the substrate, preferably on the side facing away from the transfer ply.

It can be advantageous if the substrate, preferably at least one layer of the substrate, further preferably the protective layer of the substrate, is designed transparent, preferably with a transmittance of at least 25%, preferably with a transmittance of at least 35%, further preferably with a transmittance of at least 85%, in particular in the wavelength range of from 380 nm to 780 nm.

The protective layer preferably has a layer thickness in the range of from 0.1 μm to 60 μm, preferably from 0.5 μm to 40 μm, preferably from 1.0 μm to 30 μm, and preferably has a temperature resistance of up to 250° C., preferably of up to 200° C.

The protective layer of the substrate is preferably formed from polymers selected individually or in combination from: polymethyl acrylates, polymethyl methacrylates, polyvinylidene flouride, copolymers of polymethyl acrylates and polyvinylidene fluoride, copolymers of polymethyl methacrylate and polyvinylidene flouride.

In addition, the protective layer of the substrate can have been and/or be formed from aqueous polymer dispersions, preferably from aqueous polyurethane dispersions, based on components selected individually or in combination or as hybrid dispersions from: polyether, polyester, polycarbonate, natural castor oil polyols, natural linseed oil polyols, acrylate dispersions, styrene/acrylate dispersions, vinyl acetate dispersions. These aqueous polymer dispersions can be formulated as a one-component (1C) binder system, wherein a thermal drying is carried out in order to generate a dry layer, but no chemical crosslinking of the molecular groups takes place in the process.

These aqueous polymer dispersions can be formulated as a one-component (1C) binder system, wherein a chemical crosslinking of the molecular groups takes place because reactive molecular groups of the polymers crosslink with each other, initiated by means of UV radiation.

Alternatively, these aqueous polymer dispersions can be formulated as a two-component (2C) system, wherein in addition to the polymer or polymers as one component there is a second component for crosslinking the reactive groups of the polymers, wherein the second component is in particular selected individually or in combination from isocyanates, carbodiimides, aziridines. In the case of a two-component system, a further chemical crosslinking of the polymers can additionally take place by means of UV radiation.

In addition, the protective layer of the substrate can be formed from polymers selected individually or in combination from: polyol, polyurethane (PU), copolymers of polyurethane (PU) and polyol, copolymers of polyurethane (PU) and polyacrylate. The polyurethanes (PU) are preferably formulated into a topcoat via a cobinder, for example via polyols and/or via melamine resins, or with an isocyanate binder.

The protective layer of the substrate and/or individual components of the protective layer of the substrate can be both thermally dried and/or curable by means of chemical crosslinking, in particular by means of polyisocyanate crosslinking and/or by means of aziridine crosslinking and/or by means of carbodiimide crosslinking and/or by UV curing or UV crosslinking.

It is possible, after the transfer film has been applied to the substrate, for it to be stored temporarily and/or rolled up before the next method step.

The transfer film can in particular be heated in the injection mold, before the back-injection molding, and/or the transfer film can be fixed in the injection mold, in particular by means of vacuum. This improves and simplifies the handling of the transfer film and/or prevents waste.

Further, the transfer film can be deformed, in particular deep-drawn, during the method. In particular, the deforming can be carried out in the injection mold and/or in a separate device.

The carrier film, with the master structure varnish, can preferably be peeled off before (e.g. insert-molding method) and/or after (e.g. IMD method) a back-injection molding. Further, the transfer film can also be die-cut before (e.g. insert-molding method) and/or after (e.g. IMD method) the back-injection molding.

The transfer film can in particular be deformed three-dimensionally or 2.5-dimensionally, for example be deep-drawn by means of vacuum and/or deep-drawing tools, in an insert-molding method after application to a substrate and after the carrier film has been peeled off the applied transfer ply of the transfer film. Then, the thus-obtained insert or label can be trimmed or die-cut at the outer edges and then arranged in an injection mold. To obtain a decorated plastic article, it is then back-injection molded with a plastic injection-molding material. Here, in particular, the substrate with the transfer ply of the transfer film is arranged such that the side of the substrate facing away from the transfer ply of the transfer film is aligned in the direction of the hollow space of the cavity of the injection mold.

The transfer film can, in particular in an IMD method, be arranged in an injection mold and then, to obtain a decorated plastic article, be back-injection molded with a plastic injection-molding material. Here, in particular, the transfer film is aligned such that the side of the transfer ply facing away from the topcoat is aligned in the direction of the hollow space of the cavity of the injection mold.

The structures introduced into the topcoat are for the most part preserved during the method, in particular during the deforming and/or during the back-injection molding. In other words, the structure shape and/or the structure cross section and/or the structure depth is substantially preserved, preferably the structure depth is reduced by at most 30%, preferably by at most 20%. In particular, the reduction of the structure depth is only effected locally, in particular in areas of surface with comparatively large strains of the topcoat and/or the transfer ply of the transfer film, in particular in the case of strains of the topcoat of between approx. 50% and approx. 200%, preferably between 50% and 200%.

Furthermore, preferably after the carrier ply of the film with the master structure has been removed from the transfer ply, the topcoat now forming the visible face of the transfer ply can be provided with a metalization. Cr, In, Sn, Cu and/or Al are particularly suitable as metal. The topcoat is preferably provided with a metalization with a layer thickness in the range of from 5 nm to 200 nm, in particular from 10 nm to 100 nm. The application of the metalization can be effected by means of vapor deposition. Further, the metalization can be applied homogeneously or with a gradient. In other words, the layer thickness of the metalization can remain constant and/or decrease or increase in a top view onto the plane formed by the topcoat in the x and/or y direction. In particular, a transfer ply comprising a structured topcoat with a metallic visual appearance is obtained here.

In addition, after the carrier ply of the film with the master structure has been removed from the transfer ply, a decorative layer, in particular a partial or whole-surface color layer, and/or a promoter layer, in particular adhesion-promoter layer, can also be applied to the layer forming the visible face. In particular, the application of the decorative layer and/or the promoter layer is effected after the application of a metalization. An additional optical depth effect can hereby be obtained. In particular, this effect appears to an increased extent in the case of the combination of a metalization and a decorative layer of the visible face of the transfer ply.

For example, a method, in particular an insert-molding method, for producing a plastic article decorated with a transfer ply of a transfer film can with one or more of the following steps, which are preferably carried out in the following order:

providing a transfer film comprising a carrier film comprising a master structure varnish and a transfer ply, arranged on the carrier film and detachable from the carrier film, comprising a topcoat, wherein the master structure varnish is arranged on the carrier film on its side facing the transfer ply and has a master structure and wherein the topcoat comprises a structuring which has a structure complementary to the master structure, applying, in particular hot-stamping, the transfer film to a substrate, peeling the carrier film, together with the master structure, off the transfer ply of the transfer film, optionally temporarily storing and/or rolling up the transfer film comprising the substrate, deforming the transfer film, in particular the transfer ply of the transfer film and the substrate, in particular by deep-drawing, die-cutting or laser-cutting the transfer ply of the transfer film, in particular the transfer ply and the substrate, back-injection molding the transfer film, in particular the transfer ply of the transfer film arranged on the substrate, with a plastic injection-molding material, obtaining a decorated plastic article.

A further example method, in particular IMD method, can for producing a plastic article decorated with a transfer ply of a transfer film, with one or more of the following steps, which are preferably carried out in the following order:

providing a transfer film comprising a carrier film comprising a master structure varnish and a transfer ply, arranged on the carrier film and detachable from the carrier film, comprising a topcoat, wherein the master structure varnish is arranged on the carrier film on its side facing the transfer ply and has a master structure and wherein the topcoat comprises a structuring which has a structure complementary to the master structure, arranging the transfer film in an injection mold, optionally heating the transfer film, in particular in the injection mold, optionally fixing the transfer film, in particular by means of vacuum, in the injection mold, back-injection molding the transfer film with a plastic injection-molding material, peeling the carrier film, together with the master structure, off the transfer ply of the transfer film, obtaining a decorated plastic article.

Plastic articles decorated in such a way are preferably used as decorative components for motor vehicles, for ships, for aircraft or also in telecommunications devices or household appliances.

Of course, the above-mentioned characteristics can also be applied in an equivalent way in a method or mentioned method features can also be applied in the product.

BRIEF DESCRIPTION OF THE DRAWINGS

In the following, the invention is explained by way of example with reference to several embodiment examples with the aid of the accompanying drawings. The embodiment examples shown are therefore not to be understood as limitative.

FIG. 11 shows a table summarizing the criteria for a classification of the cross-cut values according to DIN EN ISO 2409:2013-06 or according to ASTM D3359-09.

DETAILED DESCRIPTION

Figure 1:
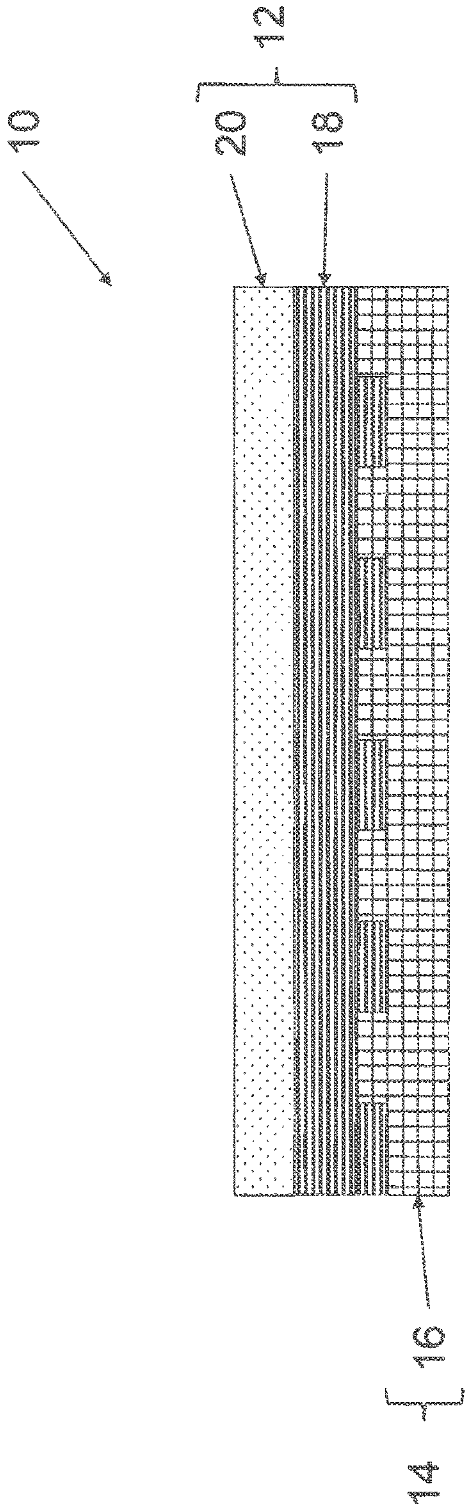
FIG. 1 shows a schematic sectional representation of a transfer film.

FIG. 1 shows a schematic sectional representation of a transfer film 10. The transfer film 10, in particular insert-molding film, IMD film, hot-stamping film, laminating film and/or as an IML film, has a carrier film 12 and a transfer ply 14 arranged on the carrier film 12 and detachable from the carrier film 12. The transfer ply 14 comprises a topcoat 16. A master structure is molded on the carrier film 12 on its side facing the transfer ply 14, wherein the topcoat 16 comprises a structuring which has a structure complementary to the master structure.

The master structure varnish 18 in FIG. 1 advantageously has the master structure.

Further, the carrier film 12 shown in FIG. 1 preferably has a carrier layer 20 and the master structure varnish 18 arranged on the carrier layer 20 in the direction of the transfer ply 14. The carrier layer 20 is preferably formed from ABS, ABS/PC, PET, PC, PMMA, PE and/or PP and its layer thickness advantageously lies in a range of from 5 μm to 100 μm, in particular from 20 μm to 80 μm.

The replicated master structure varnish 18 is arranged over the whole surface and single-layered on the plane spanned by the carrier layer 20.

The master structure varnish 18 in FIG. 1 preferably comprises components curable by UV radiation and/or a thermoplastic varnish.

The UV-curable master structure varnish 18 can be constructed from the following components selected individually or in combination from: monomeric or oligomeric polyester acrylates, polyether acrylates, urethane acrylates, epoxy acrylates, amine-urethane acrylates.

For example, in FIG. 1 a thermoplastic varnish which is suitable as master structure varnish 18 can be a varnish with the following composition:

| Constituent: | Proportion by weight: |
|---|---|
| Methyl ethyl ketone | 200 to 600, preferably 300 to 500 |
| Ethyl acetate | 100 to 400, preferably 200 to 300 |
| Butyl acetate | 50 to 300, preferably 100 to 200 |
| Polymethyl methacrylate | 50 to 250, preferably 100 to 200 |

-continued

| Constituent: | Proportion by weight: |
|---|---|
| (softening point approx. 170° C.) | |
| Cellulose nitrate | 50 to 250, preferably 100 to 200 |

The replicated master structure varnish preferably has a layer thickness in the range of from 0.1 μm to 100 μm, in particular from 0.5 μm to 50 μm, preferably from 1.0 to 30 μm.

The master structure varnish 18 in FIG. 1 advantageously has a structure depth from a range of from 0.2 μm to 30 μm, preferably from 3 μm to 20 μm.

This is because, through such a structure depth, a particularly good haptic and/or good optically variable effect of the master structure varnish 18 can be achieved.

The master structure varnish 18 in FIG. 1 preferably has a stretchability of at least 50%, preferably of at least 100%. In particular in the case of a necessary deformation of the master structure varnish in a production method and/or application method, the sufficient stretchability of the master structure varnish is advantageous. In particular in the insert-molding method, the carrier film with the master structure varnish is removed before the deformation of the transfer film, with the result that a stretchability of the master structure varnish plays only a subordinate role for this use.

The topcoat 16 in FIG. 1 is preferably arranged on the transfer film 10 such that it forms the topmost layer of the transfer ply 14 on the side of the transfer ply 14 facing the carrier film 12. In other words, the topcoat 16 can form the outermost layer on the decorated plastic article, and in particular no further protective varnish layer needs to be arranged on the topcoat 16.

The topcoat 16 in FIG. 1 preferably has a layer thickness in the range of from 0.1 μm to 60 μm, preferably from 0.5 μm μm to 40 μm, preferably from 1.0 μm to 30 μm.

Further, the topcoat 16 is preferably formed transparent and/or has, in particular in the wavelength range of from 380 nm to 780 nm, a transmittance of at least 25%, preferably of at least 35%, further preferably of at least 85%.

Furthermore, it is possible for the topcoat 16 to be dyed in FIG. 1, in particular for the topcoat 16 to be dyed by means of dye pigments, and/or for the pigmentation level of the topcoat 16 to be less than 15%, preferably less than 10%, further preferably less than 5%. It is also possible for the topcoat 16 to be colorless and/or for the pigmentation level of the topcoat 16 to be 0%. Thus, it is possible for the topcoat 16 to be and/or to form an in particular unpigmented clear varnish layer.

The topcoat 16 in FIG. 1 can be designed such that it has a gloss value in a range of from 1 to 98, preferably in a range of from 10 to 90.

Advantageously, no formation of glossy spots occurs during use of the transfer film 10, for example during shaping, in particular deep-drawing. In other words, the gloss value of the shaped transfer film 10 lies in a range of from 90% to 110%, preferably from 95% to 105%, of the gloss value of the unshaped transfer film 10, in particular in areas of surface with comparatively large strains of the topcoat and/or the transfer ply of the transfer film, in particular in the case of strains of the topcoat of between approx. 50% and approx. 200%, preferably between 50% and 200%.

Preferably, the topcoat 16 has a stretchability of at least 50%, preferably of at least 150%, in particular preferably of at least 200%.

It is advantageous if the topcoat 16 has a temperature resistance of up to 250° C., preferably of up to 200° C.

Furthermore, it is advantageous if the topcoat 16 in FIG. 1 is formed from long-chain polymers. The polymers can be formed crosslinked. The crosslinking and/or curing is preferably based on an application of thermal energy and/or UV radiation.

The topcoat 16 is preferably formed from polymers selected individually or in combination from: polymethyl acrylates, polymethyl methacrylates, polyvinylidene flouride, copolymers of polymethyl acrylates and polyvinylidene fluoride, copolymers of polymethyl methacrylate and polyvinylidene flouride.

In addition, the topcoat 16 can have been and/or be formed from aqueous polymer dispersions, preferably from aqueous polyurethane dispersions, based on components selected individually or in combination or as hybrid dispersions from: polyether, polyester, polycarbonate, natural castor oil polyols, natural linseed oil polyols, acrylate dispersions, styrene/acrylate dispersions, vinyl acetate dispersions.

In addition, the topcoat 16 can be formed from polymers selected individually or in combination from: be formed from polyol, from polyurethane (PU), from copolymers of polyurethane (PU) and polyol, and/or from copolymers of polyurethane (PU) and polyacrylates. The polyurethanes (PU) are preferably formulated into a topcoat 16 via a cobinder, for example via polyols and/or via melamine resins, or with an isocyanate binder.

The topcoat 16 and/or individual components of the topcoat 16 can be both thermally dried and/or curable by means of chemical crosslinking, in particular by means of polyisocyanate crosslinking and/or by means of aziridine crosslinking and/or by UV curing or UV crosslinking.

Polyisocyanates preferably comprise components which comprise at least two isocyanate groups, in particular wherein the isocyanate groups are at least one group selected from diisocyanate monomer, diisocyanate oligomer, diisocyanate-terminated prepolymer, diisocyanate-terminated polymer, polyisocyanate monomer, polyisocyanate oligomer, polyisocyanate-terminated prepolymer, and/or polyisocyanate-terminated polymer, and/or mixtures thereof.

It is further possible here for the diisocyanate-comprising component to comprise at least one component selected individually or in combination from: polyurethane oligomer, or polyurea oligomer, polyurethane prepolymer, polyurea prepolymer, polyurethane polymer, polyurea polymer polymer.

The components which comprise at least two isocyanate groups further preferably comprise at least one group selected individually or in combination from: hexamethylene diisocyanate (HDI), isophorone diisocyanate (IPDI), methylene diphenyl diisocyanate (MDI), toluene diisocyanate (TDI), phenylene diisocyanate, naphthalene diisocyanate (NDI), diphenyl sulfone diisocyanate, ethylene diisocyanate, propylene diisocyanate, dimers of these diisocyanates, trimers of these diisocyanates, triphenylmethane triisocyanate, polyphenylmethane polyisocyanate (polymerized MDI).

The components having hydroxyl groups used in particular for the polyisocyanate crosslinking, in particular hydroxyl-functional acrylic components, are preferably selected individually or in combination from: hydroxy monoacrylate, hydroxy diacrylate, hydroxy polyacrylate, hydroxyl-functional aliphatic polyether urethane monoacrylate, hydroxyl-functional aliphatic polyester urethane monoacrylate, hydroxyl-functional aromatic polyether urethane monoacrylate, hydroxyl-functional aromatic polyester urethane monoacrylate, hydroxyl-functional polyester monoacrylate, hydroxyl-functional polyether monoacrylate, hydroxyl-functional epoxy monoacrylate, hydroxyl-functional acrylated acrylic monoacrylate, hydroxyl-functional aliphatic polyether urethane diacrylate, hydroxyl-functional aliphatic polyester urethane diacrylate, hydroxyl-functional aromatic polyether urethane diacrylate, hydroxyl-functional aromatic polyester urethane diacrylate, hydroxyl-functional polyester diacrylate, hydroxyl-functional polyether diacrylate, hydroxyl-functional epoxy diacrylate, acrylated acrylic diacrylate, hydroxyl-functional aliphatic polyether urethane polyacrylate, hydroxyl-functional aliphatic polyester urethane polyacrylates, hydroxyl-functional polyether polyacrylate, hydroxyl-functional epoxy polyacrylate, hydroxyl-functional acrylated acrylic polyacrylate.

Melamine resins preferably comprise resins which are obtained by reacting melamine with aldehydes, in particular formaldehyde, acetaldehyde, isobutyraldehyde and glyoxal.

It is further possible for such resins to be partially or completely modified, for example by etherification of the methylol groups obtained with mono- or polyhydric alcohols. In other words, as melamine resins, in particular those which can be obtained by reacting melamine with aldehydes and optionally can be partially or completely modified are suitable.

In particular, formaldehyde, acetaldehyde, isobutyraldehyde and glyoxal are suitable as aldehydes.

Melamine formaldehyde resins are preferably reaction products of the reaction of melamine with aldehydes, e.g. the above-named aldehydes, in particular formaldehyde. Where appropriate, the methylol groups obtained are preferably modified by etherification with mono- or polyhydric alcohols.

Further, it is also advantageous that the topcoat 16 of UV-curable monomers and/or oligomers is selected individually or in combination from the group polyurethanes, polyacrylates, polymethacrylates, polyester resins, polycarbonates, phenolic resins, epoxy resins, polyureas, and/or melamine resins, in particular further preferably is selected from the group polymethyl methacrylate (PMMA), polyester, polycarbonate (PC), polyvinylidene fluoride (PVDF).

The topcoat 16 in FIG. 1 is particularly resistant to chemical and/or mechanical loads due to the above-named polymers, in particular due to the polyvinylidene fluoride. This provides the advantage in particular that in the case of the transfer ply 14 a further protective varnish layer can be dispensed with, in particular which would additionally have been applied to the topcoat 16, with the result that the topcoat 16 preferably forms the exposed visible face of the decorated plastic article 50. In other words, the topcoat 16 preferably has a high chemical resistance of its surface, preferably a substantially chemically inert surface.

Thus, the topcoat 16 is preferably formed particularly resistant to solvents, such as for example isopropanol and methyl ethyl ketone (MEK), to aggressive substances, such as for example sunscreen, hand cream, fuel, insect repellent (diethyltoluamide (DEET), e.g. Autan®), engine oil, brake fluid, coolant, polish, bitumen and tar remover, bird droppings, tree resin and/or cellulose thinner, to weathering, such as for example sunlight, rain and/or dew, to foodstuffs, such as for example coffee, to cleaning agents and/or to mechanical stresses as well as to high thermal loads.

Further, the transfer ply 14, wherein the topcoat 16 forms the visible face, has a good adhesive strength in the cross-cut test.

Figure 2:
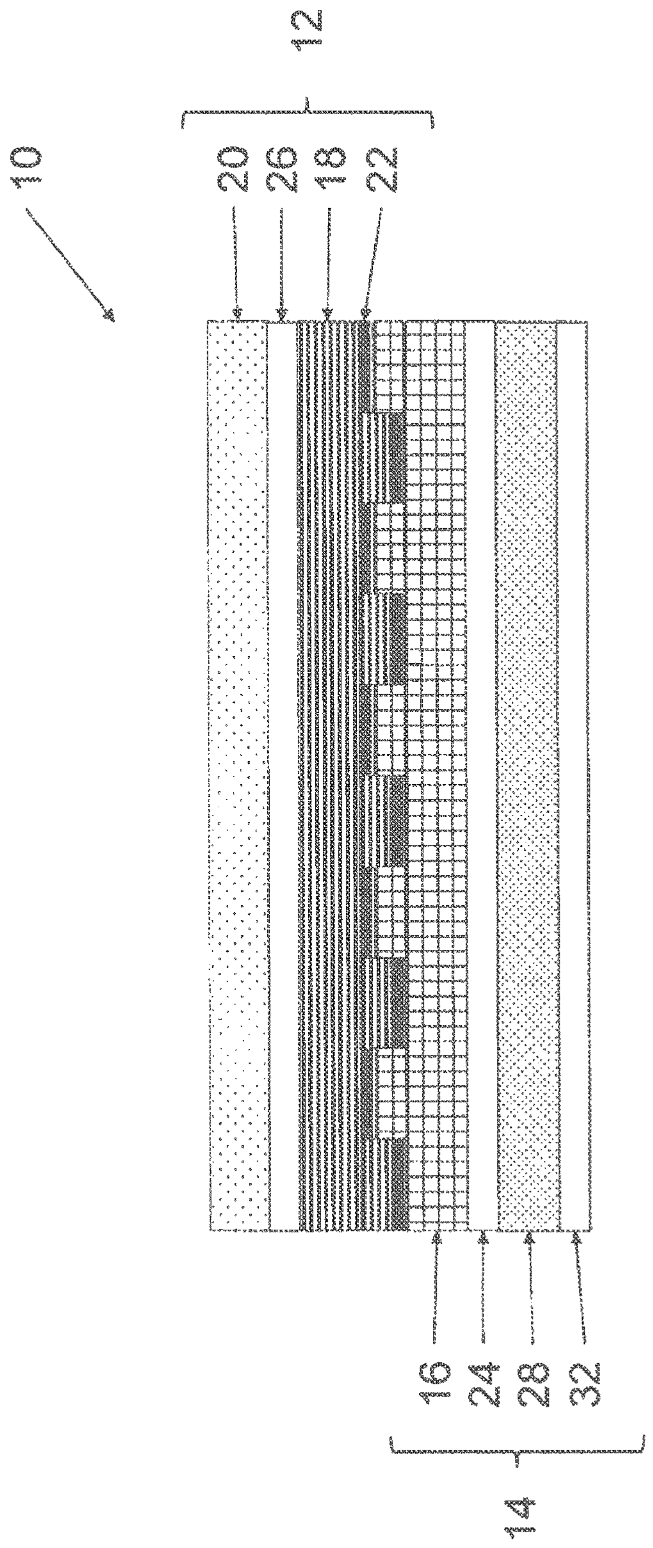
FIG. 2 shows a schematic sectional representation of a transfer film.

FIG. 2 shows a schematic sectional representation of a further transfer film 10. The transfer film 10 in FIG. 2 is based on the structure of the transfer film 10 in FIG. 1. Thus, the transfer film 10 likewise has a carrier film 12 and a transfer ply 14 arranged on the carrier film 12 and detachable from the carrier film 12. The transfer ply 14 comprises a topcoat 16. A master structure is molded on the carrier film 12 on its side facing the transfer ply 14, wherein the topcoat 16 comprises a structuring which has a structure complementary to the master structure.

However, the transfer film 10 in FIG. 2 has still further layers. Thus, the transfer film 10, in particular the transfer ply 14, can have at least one decorative layer 28, in particular at least one color layer and/or at least one metalization 30 and/or at least one adhesive layer or primer layer 32 and/or at least one replication layer. The at least one decorative layer 28, in particular at least one color layer and/or at least one adhesive layer or primer layer 32 and/or at least one replication layer, are preferably printed.

Further, the transfer ply 14 can have a promoter layer 24, in particular an adhesion-promoter layer. The at least one decorative layer 28 is arranged on the topcoat 16 on the side facing away from the master structure varnish 18.

The promoter layer of the transfer ply 24 is preferably arranged between the at least one decorative layer 28 and the topcoat 16 in the transfer ply 14.

The carrier film 12 can further have a promoter layer 26, in particular an adhesion-promoter layer, which is arranged between master structure varnish 18 and carrier layer 20.

The promoter layers of the transfer ply 24 or of the carrier film 26 ensure in particular that a very good adhesions are produced between the topcoat 16 and the other layers of the transfer ply 14, or between the carrier layer 20 and the master structure varnish 26.

In FIG. 2, as promoter layer of the transfer ply 24 and/or of the carrier film 26, components are preferably applied which are selected individually or in combination from: crosslinkable acrylates, in particular polyacrylates, polyester resins, alkyd resins as well as their modifications, amino resins, amido resins, phenolic resins. The promoter layer of the transfer ply 24 and/or of the carrier film 26 thus has and/or consists of the above components. All crosslinkers known in the state of the art can be used for crosslinking the above components. Suitable crosslinkers comprise for example isocyanates, melamines, alcohols and/or aziridines, or mixtures thereof.

A crosslinking of the promoter layer of the transfer ply 24 and/or of the carrier film 26 can be initiated in particular by UV radiation and/or by application of thermal energy and/or by chemical reaction. A first crosslinking step is preferably effected by means of thermal energy and/or chemical reaction. In an optional further process step, which can also take place with a time delay, a further and additional crosslinking can be effected by means of UV radiation. In particular, a crosslinking is effected by means of application of thermal energy and/or chemical reaction before the deformation of the transfer film and an optional additional crosslinking is effected by means of UV radiation after the deformation of the transfer film 10, preferably as one of the last process steps.

Ideally, the promoter layer of the transfer ply 24 in FIG. 2 has a layer thickness in the range of from 0.1 μm to 10 μm, preferably in the range 0.3 μm to 5 μm, preferably from 0.5 μm to 4 μm. The promoter layer of the carrier film 26 preferably has a layer thickness in the range of from 0.1 μm to 5 μm, preferably from 0.3 μm to 3 μm, particularly preferably from 0.5 μm to 2 μm.

The layer thickness of the at least one decorative layer 28 is preferably between 0.1 μm and 30 μm, in particular between 0.5 μm and 15 μm.

The at least one decorative layer 28 in FIG. 2 can have at least one partial or whole-surface color layer for generating a pattern and/or a motif. The at least one color layer can, in particular in the case of partial application, also be in register with the structure of the topcoat 16, in particular with respect to reflection, absorption and/or refractive index of the topcoat 16.

The at least one decorative layer 28 can further have at least one replication layer, into which diffractively and/or refractively acting micro- or macrostructures are molded. The at least one replication layer is preferably provided with a reflective layer, which can consist of a metalization and/or an HRI layer with a high refractive index (HRI=High Refractive Index). Here, the at least one reflective layer can be opaque, semitransparent or transparent.

One or more of the following structures can be molded in at least one replication layer: a diffractive structure, a zero-order diffraction structure, a blazed grating, a macrostructure, in particular a lens structure or microprism structure, a mirror surface, a matte structure, in particular an anisotropic or isotropic matte structure.

The structures in at least one replication structure can represent a pattern and/or a motif, which in particular also be arranged in register with the color layers of the decorative layer 28 and/or in register with the structure of the master structure varnish 18.

The at least one decorative layer 28 can further have at least one metalization 30. The at least one metalization 30 is preferably produced by means of vapor deposition. Cr, In, Sn, Cu and/or Al are particularly suitable as metal. Through the use of a layer made of metal, for example a microembossing film with metallic visual appearance is obtained.

The at least one vapor-deposited metalization 30 can be applied over the whole surface and either preserved over the whole surface or else structured with known demetalization methods such as etching, lift-off or photolithography and thereby be only partially present. However, the at least one metalization 30 can also consist of a printed layer made of metallic pigments in a binder. The printed metallic pigments can be applied over the whole surface or partially and have different colorings in different areas of surface. The at least one metalization 30 can represent a pattern and/or motif, which in particular also be arranged in register with the at least one color layer of at least one decorative layer 28 and/or with the structures of the at least one replication layer.

The at least one decorative layer 28 can further have at least one adhesive layer or primer layer 32. The at least one adhesive layer or primer layer 32 faces the plastic body to be decorated or the plastic injection-molding material 51. In other words, it is the bottommost layer of the transfer ply 14 viewed from the carrier film 12.

The at least one adhesive layer or primer layer 32 preferably has a layer thickness from a range of from 0.1 μm to 10 μm, in particular from 0.1 μm to 3 μm, and can also have several sublayers.

The layers of the transfer ply 14 arranged on the side of the topcoat 16 facing away from the carrier film 12, in particular the at least one decorative layer 28, the at least one replication layer, the promoter layer 24, the at least one adhesive layer or primer layer 32, the at least one metalization 30 and/or the at least one color layer, must in each case have at least 80% of the stretchability of the topcoat 16. In other words, the respective layer has a stretchability of at least 40%, preferably of at least 120%, preferably of at least 160%.

In the embodiment shown in FIG. 2, a detachment layer 22 is arranged between the topcoat 16 and the master structure varnish 18. This detachment layer 22 can support a reliable detachment of the transfer ply 14 from the carrier film, wherein the separating plane is located between topcoat 16 and master structure varnish 18.

In order to guarantee a clean detachment of the topcoat 16 from the master structure, the separating force between topcoat 16 and master structure preferably lies in a range of from 3 N/m to 40 N/m, preferably from 10 N/m to 30 N/m.

The detachment layer 22 preferably has a layer thickness in a range of from 0.001 μm to 2 μm, in particular from 0.05 μm to 1 μm.

The detachment layer 22 can have and/or consist of a wax. Such a wax can be for example a carnauba wax, a montanic acid ester, a polyethylene wax, a polyamide wax or a PTFE wax, or mixtures thereof. In particular, surface-active substances, such as for example silicones, or thin layers of melamine-formaldehyde-resin-crosslinked varnishes, are also suitable as detachment layer 22.

Further, the structure of the master structure layer 18 and/or the complementary structure in FIG. 2 can be formed as a relief structure, preferably as a non-random relief structure.

By a non-random relief structure is preferably meant a relief structure which is formed in a targeted manner and does not occur because of random surface roughnesses of material surfaces. Thus, non-random relief structures are recognizable in particular by the fact that they are reproducible in a targeted manner and can be present identically in several end products. If for example a relief structure with a desired profile shape is for example generated on an industrial scale in an endless carrier film, then a correspondingly structured stamp or cylinder, which has a finite length, is usually used for this. Because of the continuous use of the structured tool on the endless carrier film, the molded relief structures repeat at regular distances on the carrier film and are thus recognizably non-random relief structures, even if at first glance a random relief structure appears to be present locally.

A non-random relief structure is furthermore recognizable for example by the fact that particular profile shapes, which usually do not or only very rarely feature, occur massed, periodically or quasiperiodically. While a rather undefined and rounded profile shape is to be expected of a random relief structure, such as for example a surface roughness and/or introduced particles, non-random relief structures can comprise or consist of functional surfaces such as for example exact and geometrically formed profile shapes such as rectangular profiles, sinusoidal profiles, sawtooth profiles, hemispherical profiles or blazed structures. Further, non-random relief structures can also comprise or consist of a design, in particular technical designs, such as for example carbon fibers, waves, polygons, etc., and/or organic designs, such as for example wood grains. Furthermore, non-random relief structures display for example binary profiles or profiles with profile depth staggered in the manner of a staircase, in particular with constant profile depth, such as in particular the binary profiles described in DE 10054503 B4. A special case for a staircase-like profile is for example a rectangular profile wherein the local profile depths can adopt only discrete levels. The distances between two neighboring depressions preferably lie in a range of from 0.25 μm to 100 μm, preferably from 0.5 μm to 50 μm. The profile depth, relative to an average level, is preferably less than 15 μm, preferably less than 10 μm, particularly preferably less than 7 μm and in particular preferably values from DE 102012105571 A1. Microscopically fine, non-random relief structures with locally varying structure depth are disclosed for example in EP 0992020 B1. The non-random relief structure can also be a microstructure diffracting achromatically in a directed manner, such as is described in DE 102018123482 A1.

It is advantageous if the master relief structure is designed such that the complementary relief structure comprises a microstructure, in particular a microstructure the dimensions of which lie below the resolution limit of the unaided human eye.

Further, the master relief structure can be designed such that the complementary relief structure comprises a macrostructure, in particular a macrostructure the dimensions of which lie above the resolution limit of the unaided human eye.

A microstructure can advantageously have an optical effect which simulates the presence of a macrostructure.

The complementary relief structure can be formed as a matte structure, as a diffractive structure and/or as a refractive structure and/or as a macrostructure. Further, several of the above-named structures can also be present next to each other and/or be superimposed with each other.

Preferred matte structures have an average distance in the range of from 300 nm to 5000 nm, a roughness average, Ra, in the range of from 20 nm to 2000 nm, preferably in the range of from 50 nm to 500 nm. The correlation length, $I_c$, preferably lies in the range of from 200 nm to 50000 nm, in particular in the range of from 500 nm to 10000 nm.

Preferred diffractive structures have typical numbers of lines in the range of from 300 lines/mm to 2000 lines/mm and typical structure depths in the range of from 50 nm to 800 nm. For achromatic effects, however, very coarse grating structures with numbers of lines in the range of from 10 lines/mm to 300 lines/mm and structure depths in the range of from 0.5 μm to 10 μm can also be used.

Optically variable effects on the basis of the previously named structures can be realized for example by varying one or more structure parameters. For example by varying the grating period, the average distance, the angle of inclination of the micromirrors, the structure depth and/or the azimuthal angle.

Through the above-named properties of the master structure varnish 18, of the topcoat 16, as well as the surface structures introduced into these varnishes, defined and reproducible images, motifs and/or structures can be transferred to plastic articles to be decorated. This provides the advantage in particular over so-called soft touch varnishes, which have only a partial or whole-surface undefined, non-reproducible surface roughness.

Figure 3:
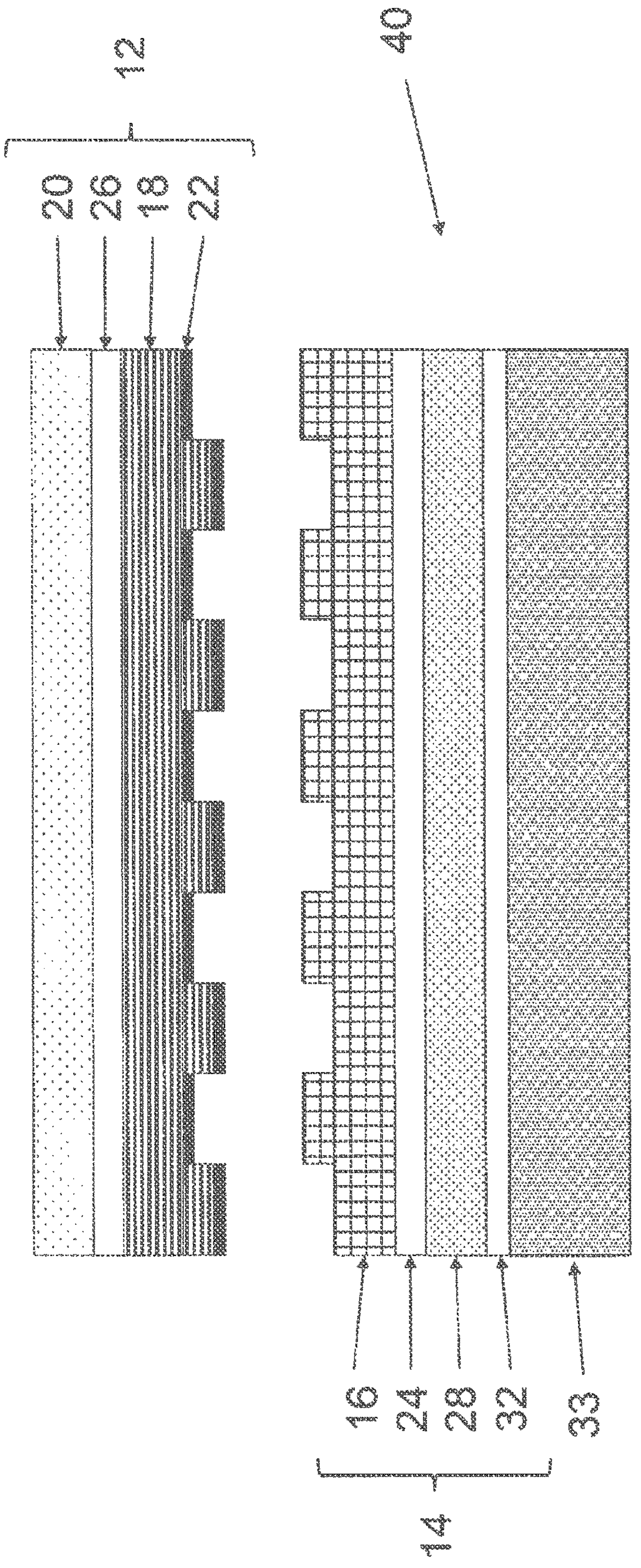
FIG. 3 shows a schematic sectional representation of a film article.

FIG. 3 shows a schematic sectional representation of a film article 40 decorated with the transfer film 10. The film article 40 was obtained by applying the transfer ply 14 to a substrate 33. The structure of the transfer film 10 substantially equates to the transfer film 10 in FIG. 2. Thus, the transfer film 10 has a carrier film 12 and a transfer ply 14 arranged on the carrier film 12 and detachable from the carrier film 12. The transfer ply 14 comprises a topcoat 16. A master structure is molded on the carrier film 12 on its side facing the transfer ply 14, wherein the topcoat 16 comprises a structuring which has a structure complementary to the master structure. The transfer ply 14 also has a promoter layer 24, preferably adhesion-promoter layer, at least one decorative layer 28 and an adhesive layer or primer layer 32. The carrier film 12 moreover has a detachment layer 22 on the master structure varnish 18 as well as a promoter layer 26, in particular adhesion-promoter layer, arranged between master structure varnish 18 and carrier film 20.

The substrate 33 can be selected for example from PC, ABS/PC, PP, TPU and/or PMMA, or blends and/or coextrudates thereof, and preferably have a thickness in the range of from 50 μm to 500 μm, preferably from 100 μm to 350 μm. Further, the carrier layer 20 has been peeled off the transfer ply 14, with the result that the topcoat 16 represents the exposed visible face.

The film article 40 shown in FIG. 3 can also be stored temporarily and/or rolled up before further processing steps.

Figure 4:
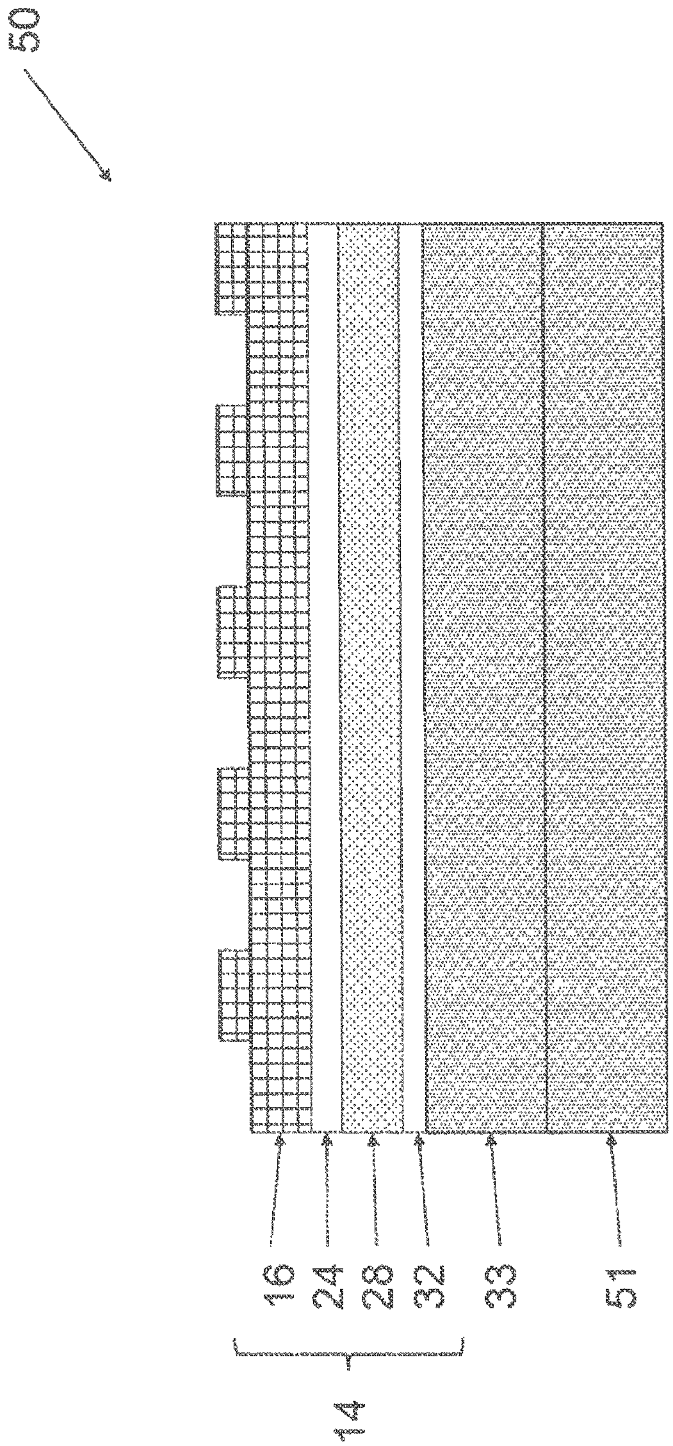
FIG. 4 shows a schematic sectional representation of a plastic article decorated with a transfer ply.

FIG. 4 shows a schematic sectional representation of a plastic article 50 decorated with a transfer ply 10. The plastic article 50 is preferably produced by means of an insert-molding method. To produce the plastic article 50, for example a transfer film 10 such as described in FIG. 2 can be used. Thus, the transfer film 10 used has a carrier film 12 and a transfer ply 14 arranged on the carrier film 12 and detachable from the carrier film 12. The transfer ply 14 also comprises a structured topcoat 16. Further, the transfer ply 14 has a promoter layer 24, preferably adhesion-promoter layer, at least one decorative layer 28 and an adhesive layer or primer layer 32.

To produce the plastic article 50 shown in FIG. 4, the transfer film 10 is applied to a substrate 33, for example a substrate 33 such as described in FIG. 3, to obtain a film body 40. The carrier film 12 with the master structure varnish 18 is preferably peeled off before the back-injection molding. Further, the transfer film 12 can also be die-cut and/or laser-cut before the back-injection molding. Further, the transfer film 10 can be deformed, in particular deep-drawn, during the method. In particular, the deforming can be carried out in an injection mold and/or in a separate device by means of a deep-drawing tool.

To produce the plastic article 50, the film article 40 is arranged in an injection mold after the die-cutting and/or laser-cutting and then back-injection molded with a plastic injection-molding material 51, to obtain a decorated plastic article 50. Here, in particular, the film article 40 with the transfer ply 14 of the transfer film 10 is aligned such that the side of the film article 40 facing away from the transfer ply 14 of the transfer film 10 faces the hollow space of the cavity of the injection mold.

The structures introduced into the topcoat 16 are for the most part preserved during the method, in particular during the deforming and/or during the back-injection molding. In other words, the structure shape and/or the structure cross section and/or the structure depth is substantially preserved, preferably the structure depth is reduced by at most 30%, preferably by at most 20%. In particular, the reduction of the structure depth is only effected locally, in particular in areas of surface with comparatively large strains of the topcoat 16 and/or the transfer ply 14 of the transfer film 10, in particular in the case of strains of the topcoat 16 of between approx. 50% and approx. 200%, in particular between 50% and 200%.

A plastic article 50 is obtained, wherein the topcoat 16 represents the outer layer and the surface has the structure complementary to the master structure layer 18. Plastic articles 50 decorated in such a way are preferably used as decorative components for motor vehicles, for ships, for aircraft or also in telecommunications devices or household appliances.

Figure 5:
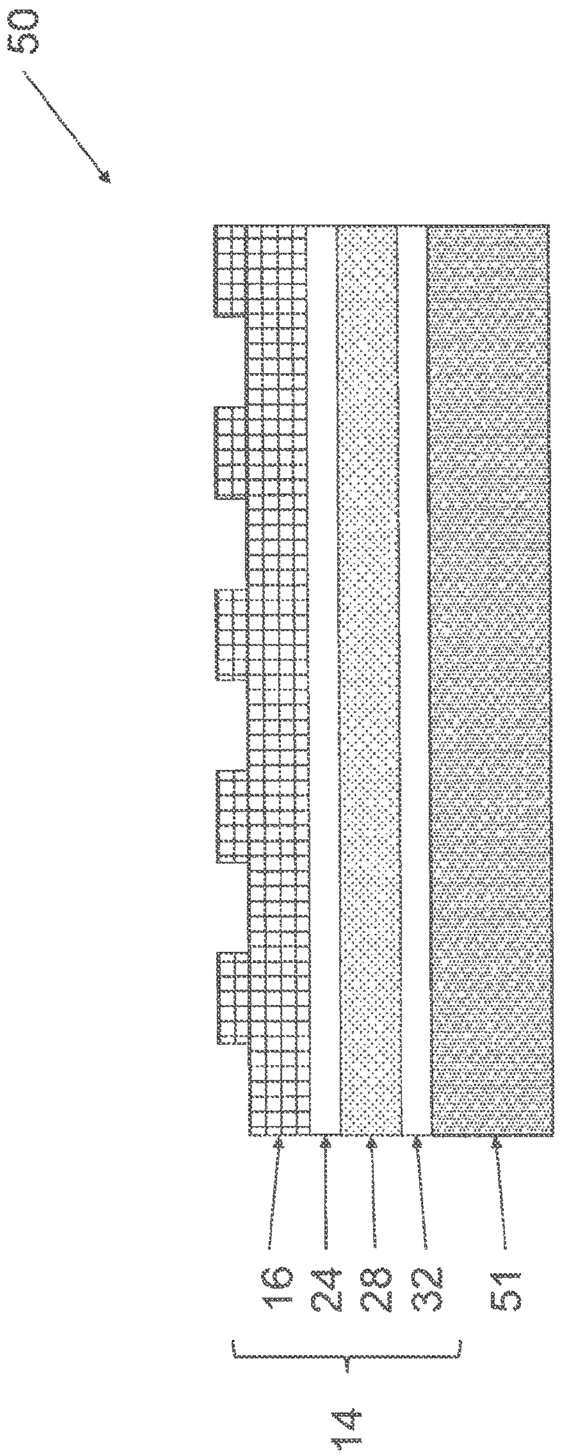
FIG. 5 shows a schematic sectional representation of a plastic article decorated with a transfer ply.

FIG. 5 shows a schematic sectional representation of a plastic article 50, decorated with a transfer ply 10, which is preferably produced by means of an IMD method. The transfer film 10 used to produce the plastic article 50 substantially equates to the transfer film 10 in FIG. 2 and has a carrier film 12 and a transfer ply 14 arranged on the carrier film 12 and detachable from the carrier film 12. The transfer ply 14 comprises a structured topcoat 16. Further, the transfer ply 14 has a promoter layer 24, preferably adhesion-promoter layer, at least one decorative layer 28 and an adhesive layer or primer layer 32.

To produce the plastic article 51, the transfer film 10 comprising carrier film 12 and transfer ply 14 is arranged in an injection mold. Here, in particular, the transfer film 12 is aligned such that the side of the transfer ply 14 facing away from the topcoat 16 is aligned in the direction of the hollow space of the cavity of the injection mold. The transfer film 10 is preferably heated in the injection mold and in particular fixed by means of vacuum, with the result that it rests against the wall of the injection mold. The transfer film 10 is then is back-injection molded with a plastic injection-molding material 51. After the demolding, the carrier film 12 can be peeled off, to obtain a decorated plastic article 50.

Figure 6:
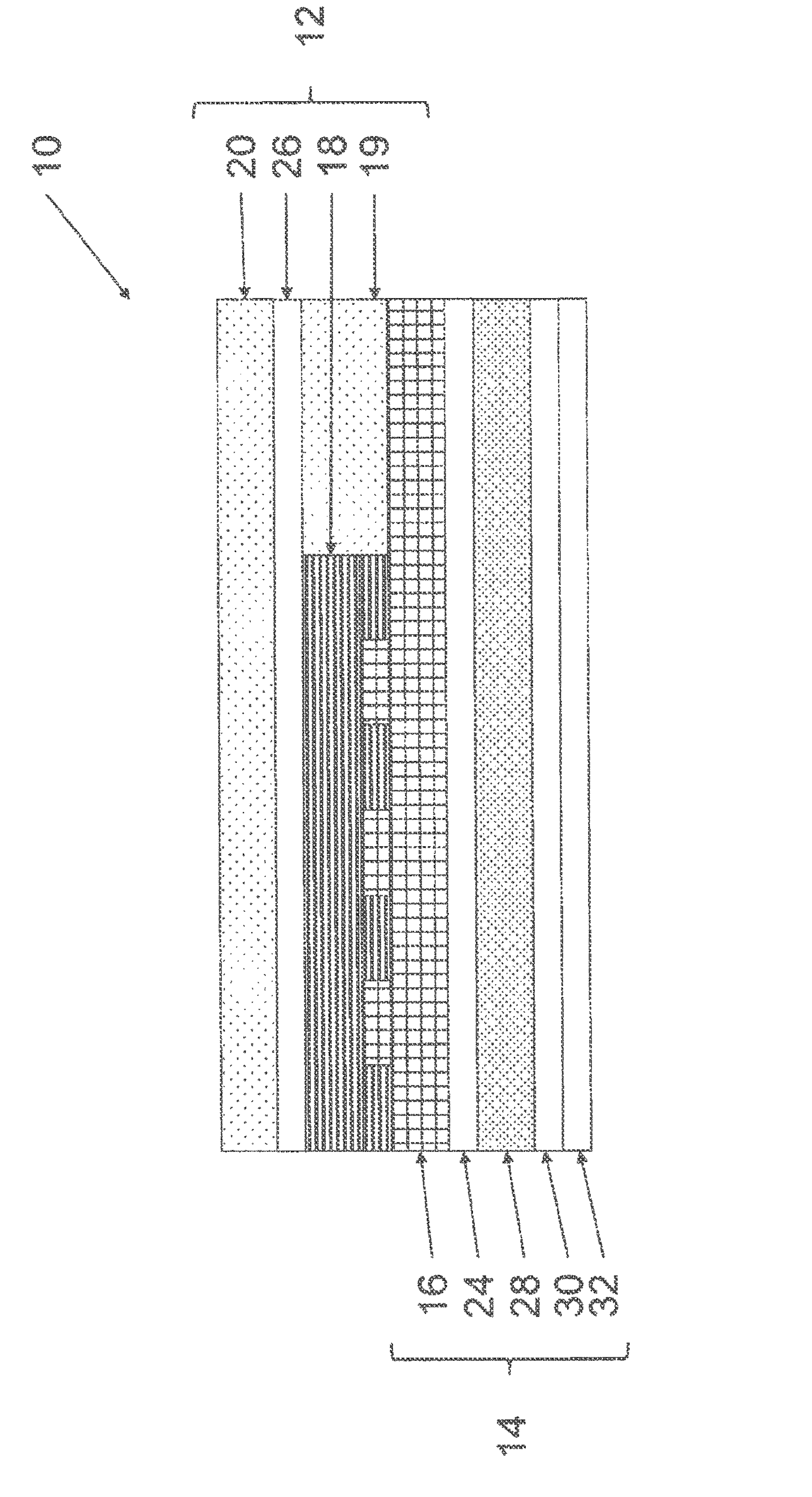
FIG. 6 shows a schematic sectional representation of a transfer film.
Figure 7:
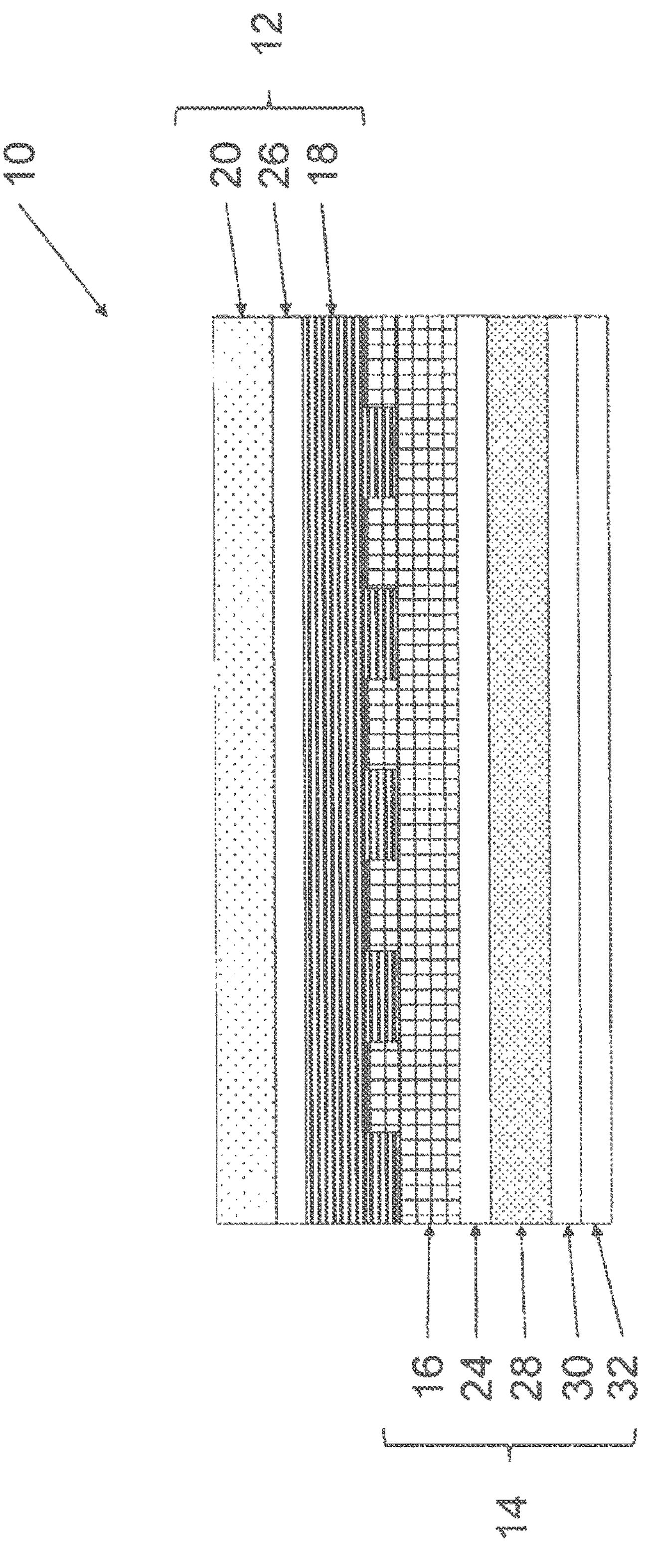
FIG. 7 shows a schematic sectional representation of a transfer film.

FIGS. 6 and 7 show a schematic sectional representation of a further transfer film 10. The structure is similar to the structure of the transfer film 12 in FIG. 2. Thus, the transfer film 10 has a carrier film 12 and a transfer ply 14 arranged on the carrier film 12 and detachable from the carrier film 12. The transfer ply 14 comprises a topcoat 16. A master structure is molded on the carrier film 12 on its side facing the transfer ply 14, wherein the topcoat 16 comprises a structuring which has a structure complementary to the master structure. The transfer ply 14 also has a promoter layer 24, preferably adhesion-promoter layer, at least one decorative layer 28 and an adhesive layer or primer layer 32. The carrier film 12 has a promoter layer 26, in particular adhesion-promoter layer, arranged between master structure varnish 18 and carrier layer 20.

In the schematic transfer film 10 shown in FIGS. 6 and 7, no detachment layer 22 is arranged between the master structure varnish 18 and the topcoat 16. Instead, the master structure, thus the master structure varnish 18, and/or the topcoat 16 has additives, such as for example silicones, aliphatic hydrocarbons, which prevent too strong an adhesion between the topcoat 16 and the master structure. In other words, the additives reduce the required separating force which is necessary in order to detach the master structure varnish 18 from the topcoat 16. Further, the adhesive layer or primer layer 32 is in contact with a metalization 30 arranged on the side facing carrier layer.

In order to guarantee a clean detachment of the topcoat 16 from the master structure, the separating force between topcoat 16 and master structure preferably lies in a range of 3 N/m and 40 N/m, preferably from 10 N/m to 30 N/m.

The transfer films 10 of FIGS. 6 and 7 differ from each other to the effect that the master structure varnish 18 in FIG. 7 is arranged on the carrier layer 20 over the whole surface, while the master structure varnish 18 in FIG. 6 is arranged on the carrier layer 20 only partially. In the areas of the carrier layer 20 where no master structure varnish 18 is arranged, a further varnish 19, in particular a varnish 19 with a surface that is not raised, preferably with a smooth and/or unstructured surface, is applied preferably at least in areas. The topcoat 16 of the transfer ply 14 in particular comprises only structuring in the areas in which the master structure varnish 18 has been applied. In the areas in which the further varnish 19 is arranged, the topcoat 16 is preferably smooth and/or unstructured.

Figure 8:
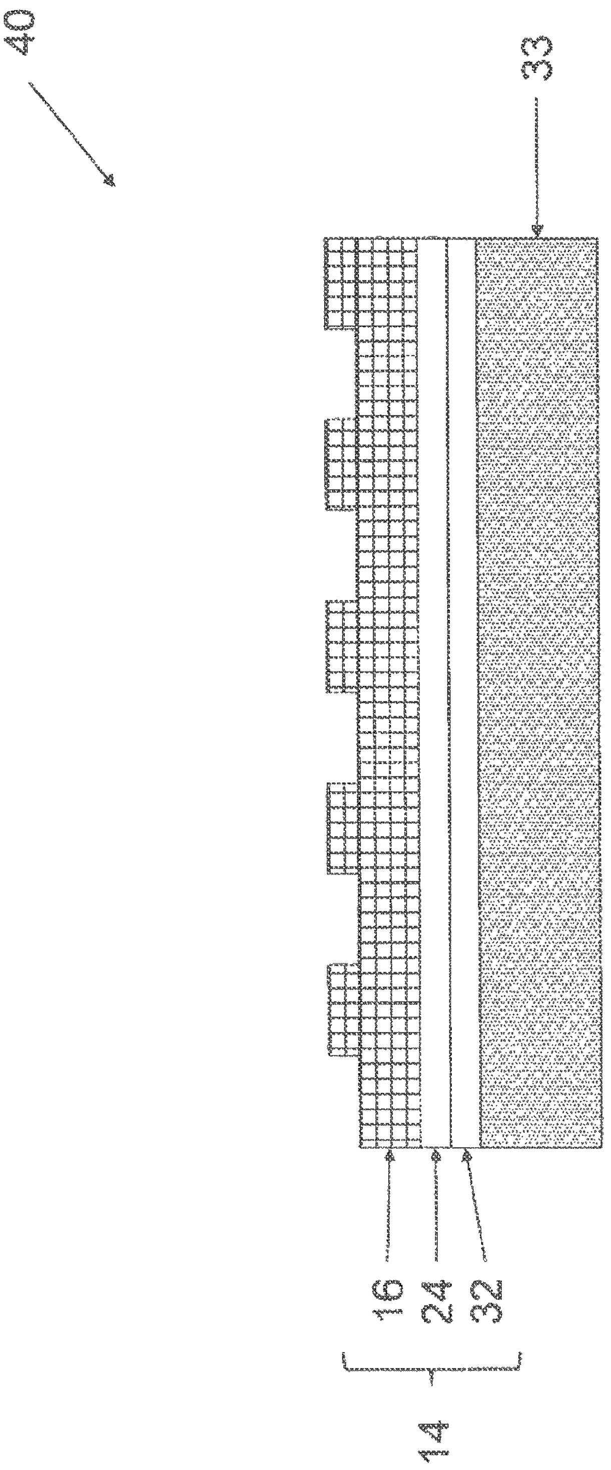
FIG. 8 shows a schematic sectional representation of a film article.

A schematic sectional representation of a film article 40 is shown in FIG. 8. The structure of the transfer ply 14 shown in FIG. 8 substantially equates to the transfer ply 14 shown in FIG. 7. Thus, the transfer ply 14 comprises a structured topcoat 16, a promoter layer 24, preferably adhesion-promoter layer, and an adhesive layer or primer layer 32. In this embodiment example, however, the transfer ply 14 has no decorative layer 28, in particular no metalization 30, arranged between the adhesive layer or primer layer 32 and the promoter layer 24. The transfer ply 14 in FIG. 8 appears transparent due to its design, in particular in the wavelength range of from 380 nm to 780 nm.

The transfer film 14 shown in FIG. 8 is arranged on a substrate 33 and the carrier film 12 in the representation shown has already been peeled off.

The substrate 33 preferably has a thickness in the range of from 50 μm to 500 μm, preferably from 100 μm to 350 μm. In particular, the transfer ply 14 is applied in such a way that, with the side facing away from the topcoat 16, the transfer ply 14 is in contact with the substrate 33. The substrate 33 can be selected for example from PC, ABS/PC, PP, TPU and/or PMMA, or blends and/or coextrudates thereof. The substrate 33 in FIG. 8 is advantageously designed transparent, preferably with a transmittance of at least 25%, preferably with a transmittance of at least 35%, further preferably with a transmittance of at least 85%, in particular in the wavelength range of from 380 nm to 780 nm.

The embodiment example shown in FIG. 8 of the transfer ply 14 arranged on the substrate 33 and with the carrier film 12 peeled off can already represent a film article 40 in its end state. Such a film article 40 can be used for example for display applications. The complementary structures of the topcoat 16 here are preferably antireflective structures, in order to suppress the reflectance of surfaces and/or increase their transmittance. In particular, the introduced structures are not arranged on the side of the display which is in contact with the user, but are arranged on the side facing away from the user. The structures are thus protected by the substrate 33 from mechanical loads in particular.

Figure 9:
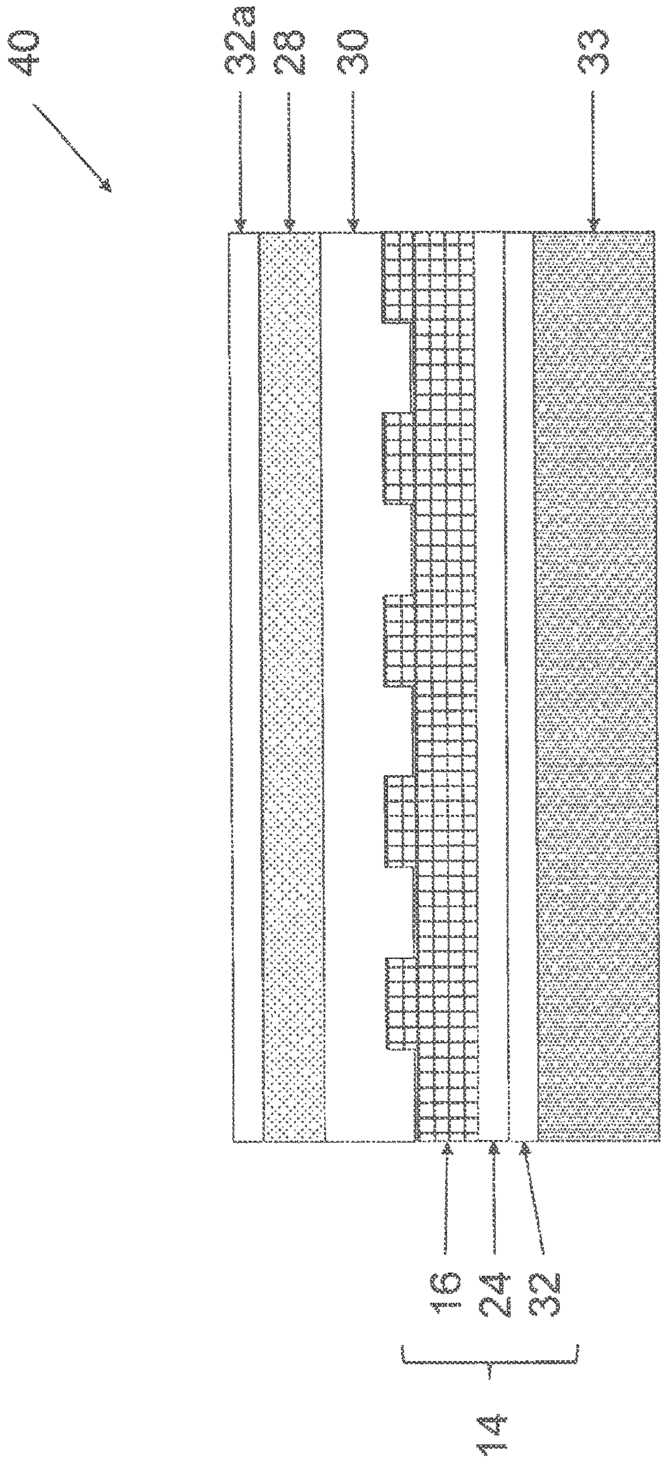
FIG. 9 shows a schematic sectional representation of a film article.

A schematic sectional representation of a film article 40 is shown in FIG. 9. The structure of the transfer ply 14 shown in FIG. 9 substantially corresponds to the transfer ply 14 shown in FIG. 7. Thus, the transfer ply 14 comprises a structured topcoat 16, a promoter layer 24, preferably adhesion-promoter layer, and an adhesive layer or primer layer 32 adhesive layer or primer layer 32 attached between topcoat 16 and promoter layer 24.

The transfer ply 14 shown in FIG. 9 was first applied to a substrate 33, for example a substrate 33 such as described in FIG. 8. The carrier film 12 of the transfer film 10 was then removed, with the result that the transfer ply 14 of the topcoat 16 remains on the transparent substrate 33 and the structure of the topcoat 16 of the transfer ply 14 forms the visible face.

Thus, the topcoat 16 can be provided with a metalization 30. Cr, In, Sn, Cu and/or Al are particularly suitable as metal. The topcoat 16 is preferably provided with a metalization 30 with a layer thickness in the range of from 5 nm to 200 nm, in particular from 10 nm to 100 nm. The application of the metalization 30 can be effected by means of vapor deposition. Further, the metalization 30 can be applied homogeneously or with a gradient. In other words, the layer thickness of the metalization 30 can remain constant and/or decrease or increase in a top view onto the plane formed by the topcoat 16 in the x and/or y direction. In particular, a transfer ply 14 comprising a structured topcoat 16 with a metallic visual appearance is obtained here.

In addition, after the carrier film 12 of the film with the master structure has been removed from the transfer ply 14, further layers such as for example a decorative layer 28, in particular a partial or whole-surface color layer, and/or a promoter layer 24, in particular adhesion-promoter layer, can also be applied to the layer forming the visible face. In particular, the application of the decorative layer 28 and/or the promoter layer 24 is effected after the application of a metalization 30.

An adhesive layer or primer layer 32*a* can then be applied to the decorative layer 28. The adhesive layer or primer layer 32*a* is selected such that it is suitable for the plastic injection-molding material 51 of a subsequent injection-molding process and thus joined in particular to the plastic injection-molding material 51.

The film article 40 obtained, in particular consisting of substrate 33, transfer ply 14, the metalization 30, decorative layer 28, promoter layer 24 and/or adhesive layer or primer layer 32*a*, can then be deformed, in particular deep-drawn and/or die-cut and/or back-injection molded. Here, the film article 40 is arranged in the injection mold such that the substrate 33 rests against the wall of the injection mold. The plastic injection-molding material 51, not represented in more detail in FIG. 9, is applied to the outer free side of the film article 40, thus to the side facing away from the wall, in particular to the primer layer 32*a*. The structuring of the topcoat 16 is thus embedded between the substrate 33 and the plastic injection-molding material 51. The structuring is thus protected by the substrate 33 from external influences. Furthermore, an additional optical depth effect is obtained through the structure shown in FIG. 9 of the film article 40.

Still further layers can then be applied to the free side of the substrate 33 facing away from the plastic injection-molding material 51. In particular, these can be protective layers, which improve the mechanical and/or chemical resistance of the substrate 33. These protective layers can be wet painted and/or be applied by means of transfer methods and/or by means of laminating methods.

The substrate 33 can be single-layered or multi-layered and in particular have a self-supporting layer 33*a*, which consists of materials selected individually or in combination from ABS, ABS/PC, PET, PC, PMMA, PE, PP. The substrate can likewise of PET.

The substrate 33 can have further layers on the self-supporting layer 33*a*, selected individually or in combination from adhesion-promoter layer, metal layer, color layer, functional layer, replication layer, decorative layer, protective layer.

Figure 10:
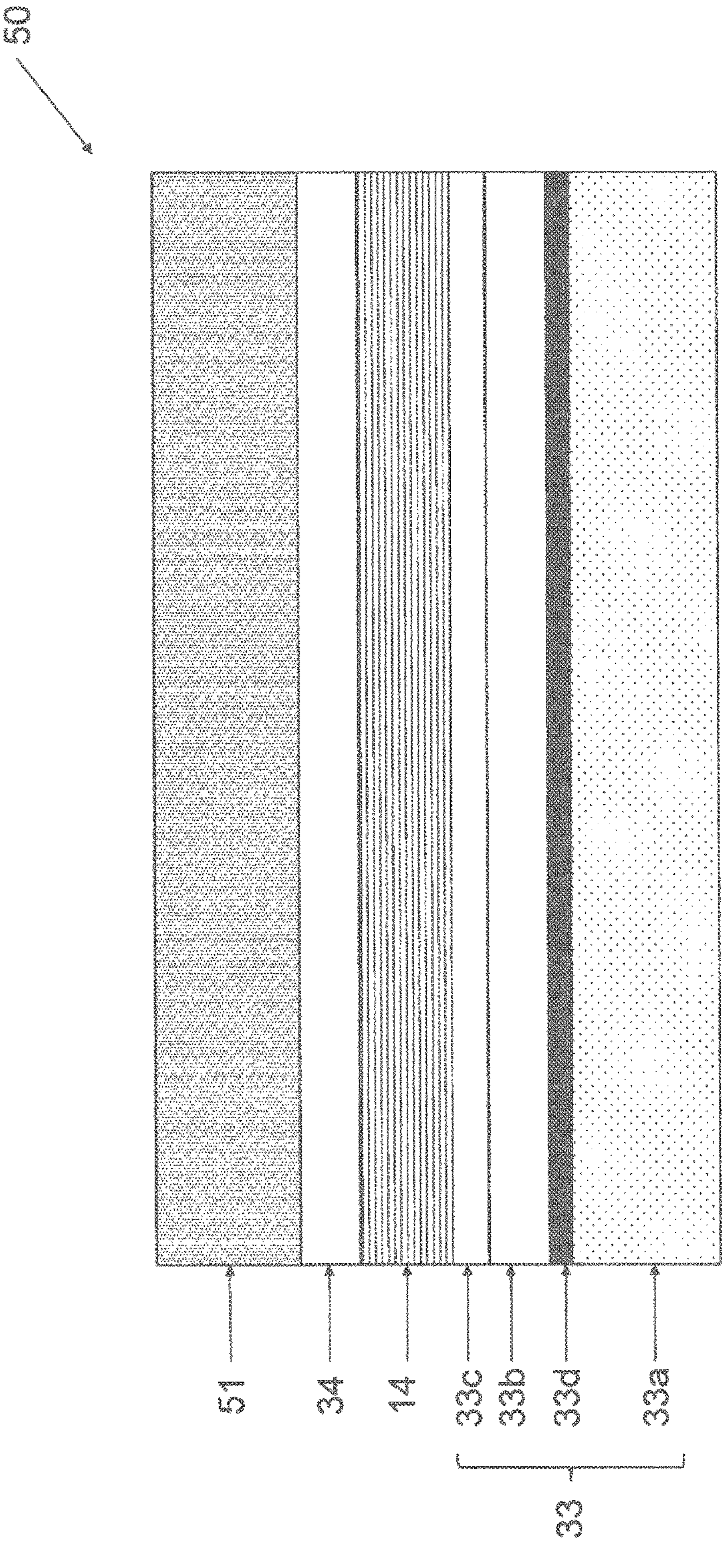
FIG. 10 shows a schematic sectional representation of a plastic article.

In the embodiment shown in FIG. 10 the substrate 33 has a self-supporting layer 33*a*, to which a protective layer 33*b* is applied. A detachment layer 33*c*, which allows a detachment of the protective layer 33*b* from the self-supporting layer 33*a*, is preferably arranged between the self-supporting layer 33*a* and the protective layer 33*b*. In particular, an adhesion-promoter layer 33*d* is arranged on the side of the protective layer 33*b* facing away from the self-supporting layer 33*a*, in order to improve an adhesion of a layer applied thereto or of a layer pack applied thereto.

FIG. 10 now shows that the transfer ply 14 is applied to the protective layer 33*b* or to the adhesion-promoter layer 33*d*. Similarly to FIG. 9, still further layers 34, in particular a decorative layer 28, in particular a partial or whole-surface color layer, and/or a promoter layer 24, in particular adhesion-promoter layer, can now be applied to the free outer side of the transfer ply 14. In particular, the application of the decorative layer 28 and/or the promoter layer 24 is effected after the application of a metalization 30.

The film article 40 obtained, in particular consisting of self-supporting layer 33*a*, protective layer 33*b*, optionally adhesion-promoter layer 33*c*, optionally detachment layer 33*d*, transfer ply 14, metalization 30, decorative layer 28, promoter layer 24 and/or adhesive layer or primer layer 32, can then be deformed, in particular deep-drawn and/or die-cut and/or back-injection molded. Here, the film article 40 is arranged in the injection mold such that the substrate 33 rests against the wall of the injection mold. The plastic injection-molding material 51, not represented in more detail in FIG. 10, is applied to the outer free side of the film article 40. A plastic article 50 is obtained.

After the deep-drawing and/or die-cutting and/or back-injection molding, the self-supporting layer 33*a* can be peeled off the protective layer 33*b*. The optionally present detachment layer 33*d* can remain on the self-supporting layer 33*a* or remain on the protective layer 33*b*.

The protective layer 33*b* preferably has a layer thickness in the range of from 0.1 μm to 60 μm, preferably from 0.5 μm to 40 μm, preferably from 1.0 μm to 30 μm.

Preferably, the protective layer 33*b* is formed transparent and/or has, in particular in the wavelength range of from 380 nm to 780 nm, a transmittance of at least 25%, preferably of at least 35%, further preferably of at least 85%.

It is advantageous if the protective layer 33*b* has a temperature resistance of up to 250° C., preferably of up to 200° C.

The protective layer 33*b* is preferably formed from polymers selected individually or in combination from: polymethyl acrylates, polymethyl methacrylates, polyvinylidene flouride, copolymers of polymethyl acrylates and polyvinylidene fluoride, copolymers of polymethyl methacrylate and polyvinylidene flouride.

In addition, the protective layer 33*b* can have been and/or be formed from aqueous polymer dispersions, preferably from aqueous polyurethane dispersions, based on components selected individually or in combination or as hybrid dispersions from: polyether, polyester, polycarbonate, natural castor oil polyols, natural linseed oil polyols, acrylate dispersions, styrene/acrylate dispersions, vinyl acetate dispersions.

These aqueous polymer dispersions can be formulated as a one-component (1C) binder system, wherein a thermal drying is carried out in order to generate a dry layer, but no chemical crosslinking of the molecular groups takes place in the process.

These aqueous polymer dispersions can be formulated as a one-component (1C) binder system, wherein a chemical crosslinking of the molecular groups takes place because reactive molecular groups of the polymers crosslink with each other, initiated by means of UV radiation.

Alternatively, these aqueous polymer dispersions can be formulated as a two-component (2C) system, wherein in addition to the polymer or polymers as one component there is a second component for crosslinking the reactive groups of the polymers, wherein the second component is in particular selected individually or in combination from isocyanates, carbodiimides, aziridines. In the case of a two-component system, a further chemical crosslinking of the polymers can additionally take place by means of UV radiation.

In addition, the protective layer 33*b* can be formed from polymers selected individually or in combination from: polyol, polyurethane (PU), copolymers of polyurethane (PU) and polyol, copolymers of polyurethane (PU) and polyacrylate. The polyurethanes (PU) are preferably formulated into a topcoat via a cobinder, for example via polyols and/or via melamine resins, or with an isocyanate binder.

The protective layer 33*b* and/or individual components of the protective layer 33*b* can be both thermally dried and/or curable by means of chemical crosslinking, in particular by means of polyisocyanate crosslinking and/or by means of aziridine crosslinking and/or by means of carbodiimide crosslinking and/or by UV curing or UV crosslinking.

Of course, the listed embodiment variants, in particular with respect to the layer structure or arrangement of the transfer film 10, can be combined with each other as desired and do not represent a limitation.

LIST OF REFERENCE NUMBERS

10 transfer film
12 carrier film
14 transfer ply
16 topcoat
18 master structure varnish
19 varnish
20 carrier layer
22 detachment layer
24 promoter layer
26 promoter layer
28 decorative layer
30 metalization
32 adhesive layer or primer layer
32*a* adhesive layer or primer layer
33 substrate
33*a* self-supporting layer
33*b* protective layer
33*c* adhesion-promoter layer
33*d* detachment layer
34 further layers
40 film article
50 plastic article
51 plastic injection-molding material

The invention claimed is:

1. A method for producing a transfer film, the method comprising:
- applying a master structure varnish to a carrier film;
- introducing a replicated master structure in the master structure varnish; and
- applying a topcoat to the replicated master structure, wherein a structure complementary to the replicated master structure of the master structure varnish is molded into the topcoat,
- wherein the topcoat having the structure complementary to the replicated master structure of the master structure varnish forms a layer of a transfer ply, the transfer ply being arranged on the carrier film and detachable from the carrier film, and
- wherein the transfer ply has further layers arranged on the side of the topcoat facing away from the carrier film, the further layers of the transfer ply arranged on the side of the topcoat facing away from the carrier film having a stretchability of at least 80% of a stretchability of the topcoat, and
- wherein the master structure varnish has components curable by UV radiation, and
- wherein the topcoat is formed from polymers selected individually or in combination from:
  - polymethyl acrylates, polymethyl methacrylates, polyvinylidene flouride, copolymers of polymethyl acrylates and polyvinylidene fluoride, copolymers of polymethyl methacrylate and polyvinylidene fluoride,
  - and/or
  - polyol, polyurethane (PU), copolymers of polyurethane (PU) and polyol, copolymers of polyurethane (PU) and polyacrylate.

2. The method according to claim 1, wherein the master structure varnish and/or the topcoat has a relief structure, at least in areas.

3. The method according to claim 2, wherein the relief structure has a design and/or one or more of the following profile shapes: rectangular profiles, sinusoidal profiles, sawtooth profiles, hemispherical profiles or blazed structures.

4. The method according to claim 2, wherein the relief structure is formed as or comprises a matte structure, a diffractive structure, a refractive structure and/or a macrostructure.

5. The method according to claim 2, wherein the relief structure comprises a microstructure.

6. The method according to claim 2, wherein the relief structure comprises a macrostructure.

7. The method according to claim 1, wherein the carrier film has a carrier layer, wherein the carrier layer is arranged on the side of the carrier film facing away from the transfer ply.

8. The method according to claim 7, wherein the carrier layer is formed from ABS, ABS/PC, PET, PC, PMMA, PE and/or PP and/or wherein the layer thickness of the carrier layer is selected from a range of from 5 μm to 100 μm.

9. The method according to claim 7, wherein a promoter layer is arranged in the carrier film between the master structure varnish and the carrier layer.

10. The method according to claim 9, wherein the promoter layer of the carrier film has components selected individually or in combination from: crosslinkable acrylates, polyester resins, alkyd resins as well as their modifications, amino resins, amido resins, phenolic resins.

11. The method according to claim 1, wherein the replicated master structure has a structure depth from a range of from 0.2 μm to 30 μm.

12. The method according to claim 1, wherein the master structure varnish has components curable by a thermoplastic varnish.

13. The method according to claim 1, wherein the topcoat is formed transparent and/or has a transmittance of at least 25%.

14. The method according to claim 1, wherein the topcoat has a stretchability of at least 50%.

15. The method according to claim 1, wherein the topcoat has a temperature resistance of up to 250° C.

16. The method according to claim 1, wherein a detachment layer is arranged between the topcoat and the master structure varnish and/or wherein the topcoat and/or the master structure varnish have additives which reduce the separating force which is necessary in order to detach the master structure varnish from the topcoat.

17. The method according to claim 1, wherein the transfer ply has a promoter layer, wherein the promoter layer is arranged on the side of the topcoat facing away from the carrier film.

18. The method according to claim 17, wherein the promoter layer of the transfer ply has components selected individually or in combination from: crosslinkable acrylates, polyester resins, alkyd resins as well as their modifications, amino resins, amido resins, phenolic resins.

19. The method according to claim 17, wherein the promoter layer of the transfer ply has a layer thickness in the range of from 0.1 μm to 10 μm.

20. The method according to claim 1, wherein the transfer film has at least one decorative layer, at least one metalization, at least one replication layer and/or at least one adhesive layer or primer layer.

21. The method according to claim 1, wherein the master structure varnish is applied to a carrier layer of the carrier film.

22. The method according to claim 21, wherein the master structure varnish is applied to the carrier layer over the whole surface or partially.

23. The method according to claim 21, wherein a further varnish is applied at least in areas to the carrier layer in areas where no master structure varnish is applied.

24. The method according to claim 21, wherein further layers are applied to the topcoat and/or wherein a promoter layer is printed on the carrier layer.

25. The method according to claim 1, wherein the master structure varnish is crosslinked and/or cured during the production of the transfer film.

26. The method according to claim 1, wherein at least one metalization is applied to the transfer ply.

27. The method according to claim 1, wherein the topcoat is crosslinked and/or cured, during the production of the transfer film.

28. A method for producing a plastic article or film article decorated with a transfer ply of a transfer film with the following steps:

providing a transfer film comprising a carrier film and a transfer ply arranged on the carrier film and detachable from the carrier film, the carrier film comprising a master structure varnish and the transfer ply comprising a topcoat, wherein the master structure varnish is arranged on the carrier film on its side facing the transfer ply and has a replicated master structure and wherein the topcoat comprises a structuring which has a structure complementary to the replicated master structure, peeling the carrier film, together with the replicated master structure, off the transfer ply of the transfer film, arranging the transfer film in an injection mold, back-injection molding the transfer film with a plastic injection-molding material, obtaining a decorated plastic article or a film article, wherein the transfer ply has layers arranged on the side of the topcoat facing away from the carrier film, the layers of the transfer ply arranged on the side of the topcoat facing away from the carrier film having a stretchability of at least 80% of a stretchability of the topcoat, and wherein the master structure varnish has components curable by UV radiation, and wherein the topcoat is formed from polymers selected individually or in combination from:

polymethyl acrylates, polymethyl methacrylates, polyvinylidene flouride, copolymers of polymethyl acrylates and polyvinylidene fluoride, copolymers of polymethyl methacrylate and polyvinylidene fluoride, and/or polyol, polyurethane (PU), copolymers of polyurethane (PU) and polvol, copolymers of polyurethane (PU) and polyacrylate.

29. The method according to claim 28, wherein the method comprises the further step:

applying, the transfer film to a substrate.

30. The method according to claim 29, wherein the method comprises the further step:

temporarily storing and/or rolling up the transfer film comprising the substrate.

31. The method according to claim 28, wherein the structure depth of the transfer film is reduced by at most 30%.

32. The method according to claim 28, wherein the method comprises the further step:

heating the transfer film.

33. The method according to claim 28, wherein the method comprises the further step:

fixing the transfer film, in the injection mold.

34. The method according to claim 28, wherein the method comprises the further step:

deforming the transfer film.

* * * * *